(12) United States Patent  (10) Patent No.: US 8,190,792 B2
Ohno et al.  (45) Date of Patent: May 29, 2012

(54) INPUT-OUTPUT MANAGEMENT DEVICE AND INFORMATION PROCESSING DEVICE

(75) Inventors: Takashi Ohno, Kawasaki (JP); Ryuichi Matsukura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/094,353

(22) Filed: Apr. 26, 2011

(65) Prior Publication Data

US 2011/0202693 A1   Aug. 18, 2011

Related U.S. Application Data

(63) Continuation of application No. PCT/JP2008/069910, filed on Oct. 31, 2008.

(51) Int. Cl.
*G06F 3/00* (2006.01)
(52) U.S. Cl. ........ 710/19; 710/15; 710/17; 710/18; 345/1.1; 345/1.3; 345/2.1; 715/716; 715/718; 715/733; 715/740
(58) Field of Classification Search .......... None
See application file for complete search history.

(56) References Cited

U.S. PATENT DOCUMENTS

| | | | | |
|---|---|---|---|---|
| 4,527,250 A * | 7/1985 | Galdun et al. | ............... | 715/700 |
| 5,699,514 A * | 12/1997 | Durinovic-Johri et al. | ..... | 726/19 |
| 6,232,932 B1 * | 5/2001 | Thorner | ................ | 345/1.3 |
| 6,970,173 B2 * | 11/2005 | Ciolac | .................. | 345/544 |
| 7,030,836 B2 * | 4/2006 | Justice et al. | ............ | 345/1.1 |
| 2003/0163371 A1 * | 8/2003 | Beard | .................. | 705/14 |
| 2006/0244724 A1 * | 11/2006 | Erickson | ............... | 345/163 |
| 2006/0267857 A1 * | 11/2006 | Zhang et al. | ............ | 345/1.1 |
| 2007/0083604 A1 * | 4/2007 | Zimman et al. | ............ | 709/207 |
| 2007/0133843 A1 | 6/2007 | Nakatani | ............ | 382/115 |
| 2008/0046750 A1 * | 2/2008 | Fletcher et al. | ........... | 713/185 |
| 2009/0085871 A1 * | 4/2009 | Bhogal et al. | ........... | 345/163 |

FOREIGN PATENT DOCUMENTS

| | | | |
|---|---|---|---|
| EP | 1114981 A2 * | 7/2001 | |
| JP | 61-045344 | 3/1986 | |
| JP | 61-45344 | 3/1986 | |
| JP | 6-96004 | 4/1994 | |
| JP | 2004-139419 | 5/2004 | |
| JP | 2004139419 A * | 5/2004 | |
| JP | 2007-164448 | 6/2007 | |

OTHER PUBLICATIONS

"Popup Windows" by Stephen Chapman from about.com, published on Oct. 17, 2007.*
International Search Report for PCT/JP2008/069910, mailed Jan. 27, 2009.

* cited by examiner

*Primary Examiner* — Steven Snyder
(74) *Attorney, Agent, or Firm* — Fujitsu Patent Center

(57) ABSTRACT

When the activation of an output device is detected, the response prompt screen on which a response by an input device is requested is displayed on the activated output device, and when a response from the input device is received through the displayed response prompt screen, the input device which has returned a response is associated with the output device whose response prompt screen is displayed.

15 Claims, 22 Drawing Sheets

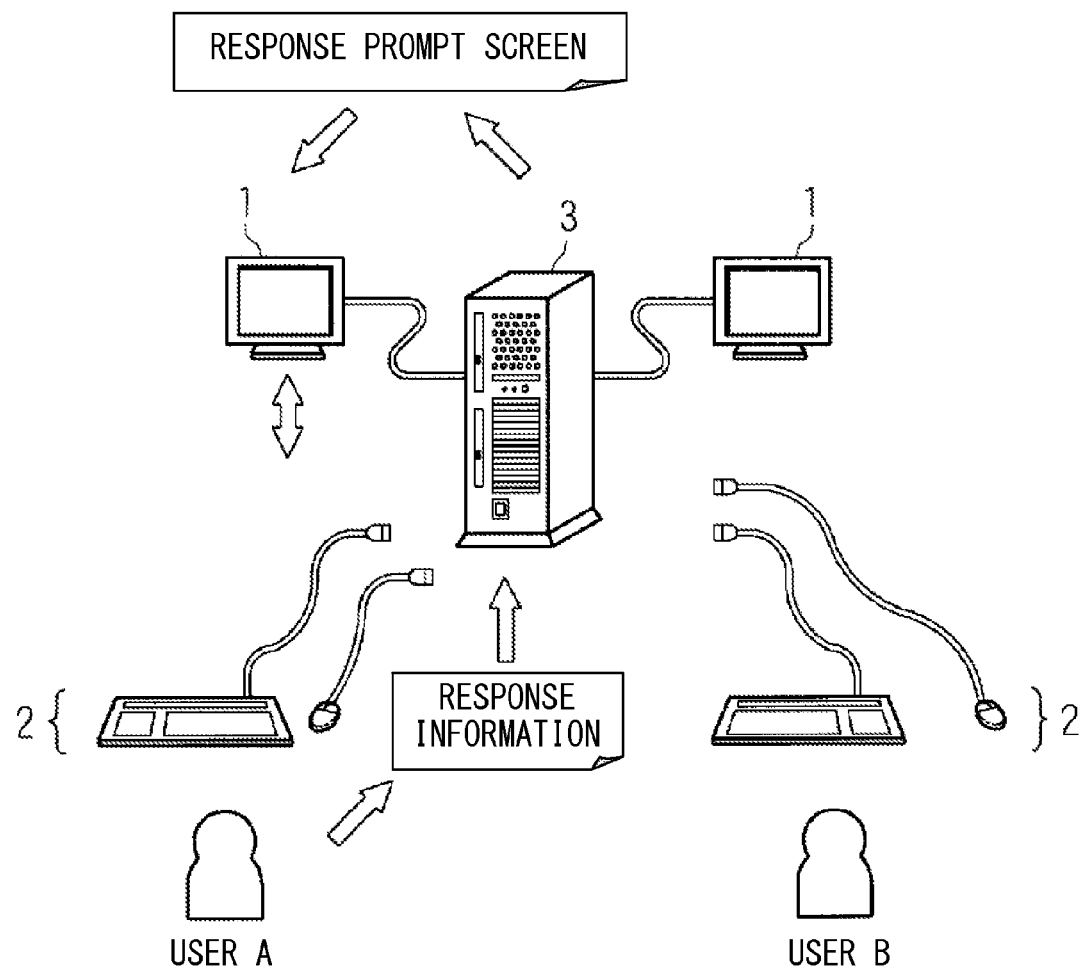
F I G. 1

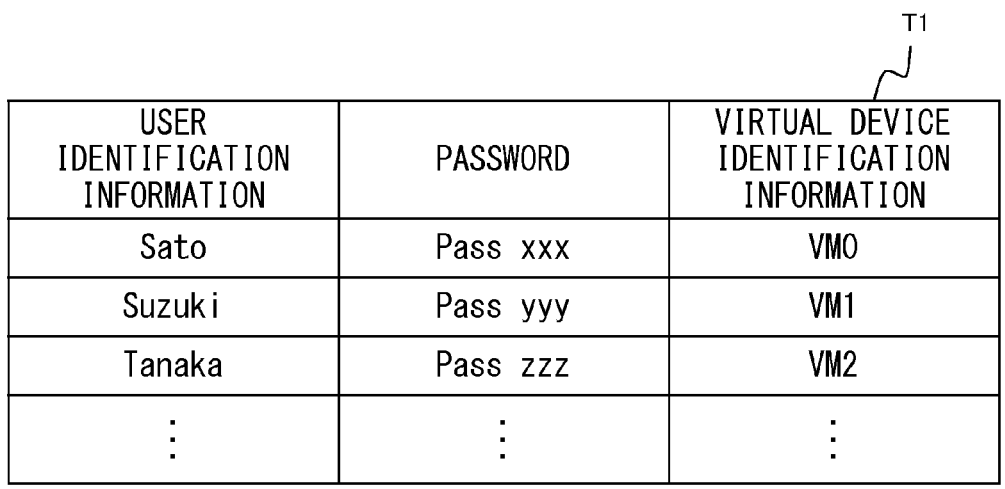
F I G. 3

| GROUPING NUMBER | INPUT DEVICE IDENTIFICATION INFORMATION | INPUT DEVICE TYPE INFORMATION |
|---|---|---|
| GROUP 0 | 0X1000-0000 | CONCENTRATOR |
| | 0X1000-0001 | KEYBOARD |
| | 0X1000-0002 | MOUSE |
| GROUP 1 | 0X1000-0003 | CONCENTRATOR |
| | 0X1000-0004 | KEYBOARD |
| | 0X1000-0005 | MOUSE |
| GROUP 2 | 0X1000-0006 | CONCENTRATOR |
| | 0X1000-0007 | KEYBOARD |
| | 0X1000-0008 | MOUSE |
| ⋮ | ⋮ | ⋮ |

T2

F I G. 4

F I G. 5

| INPUT DEVICE IDENTIFICATION INFORMATION | EVENT | ARGUMENT |
|---|---|---|
| 0X1000-0002 | LEFT BUTTON UP | COORDINATES (800, 600) |

FIG. 8

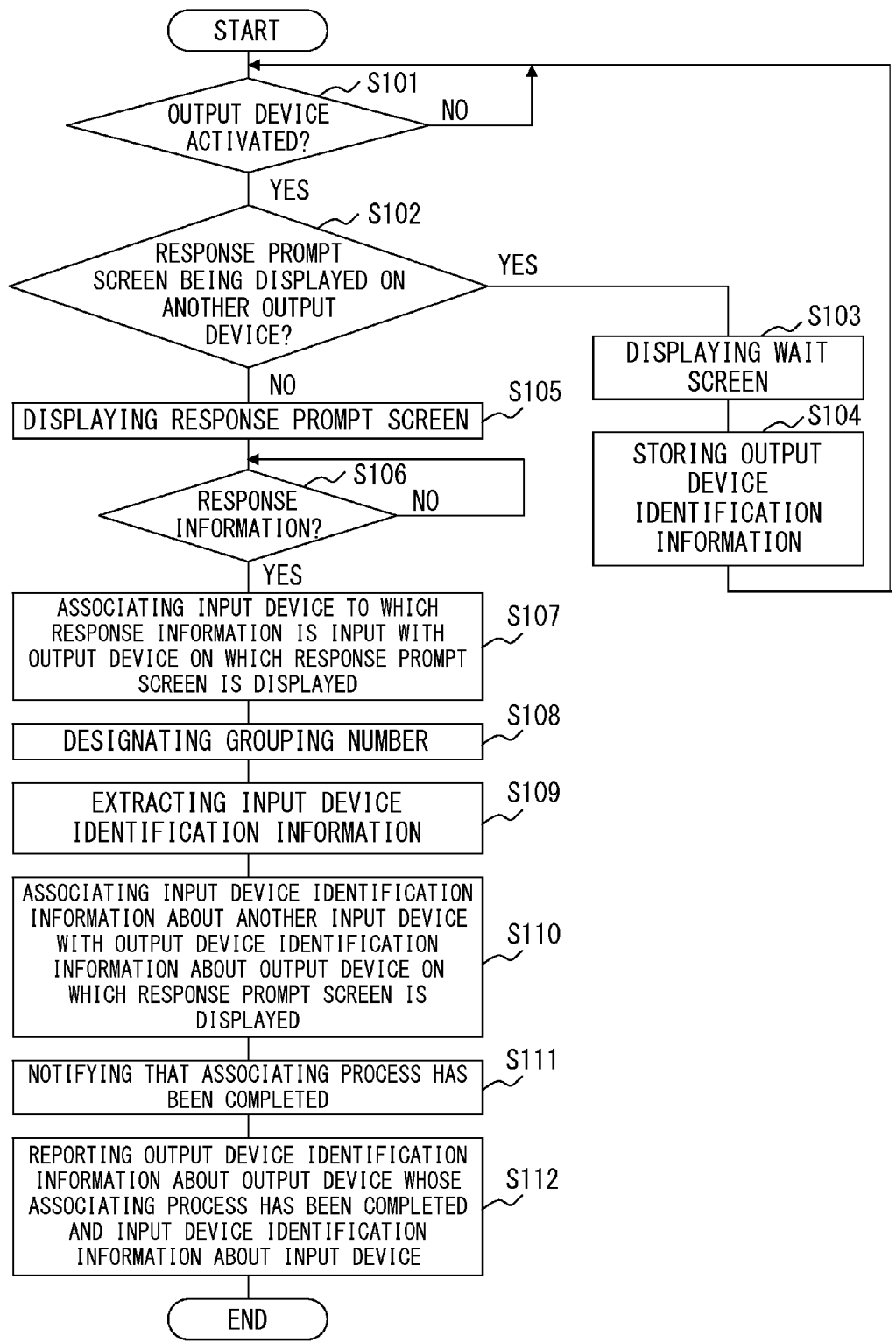
F I G. 9

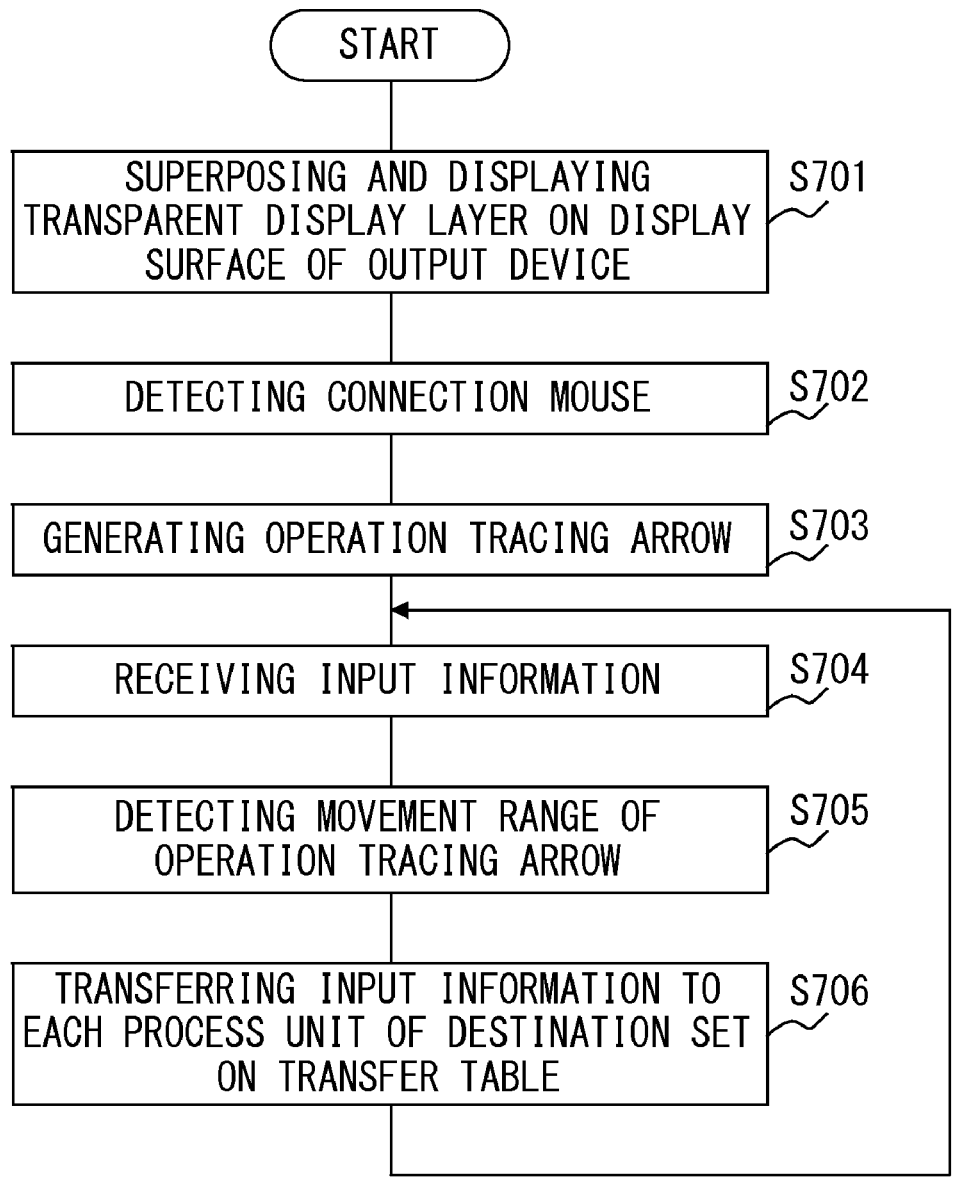
F I G. 1 5

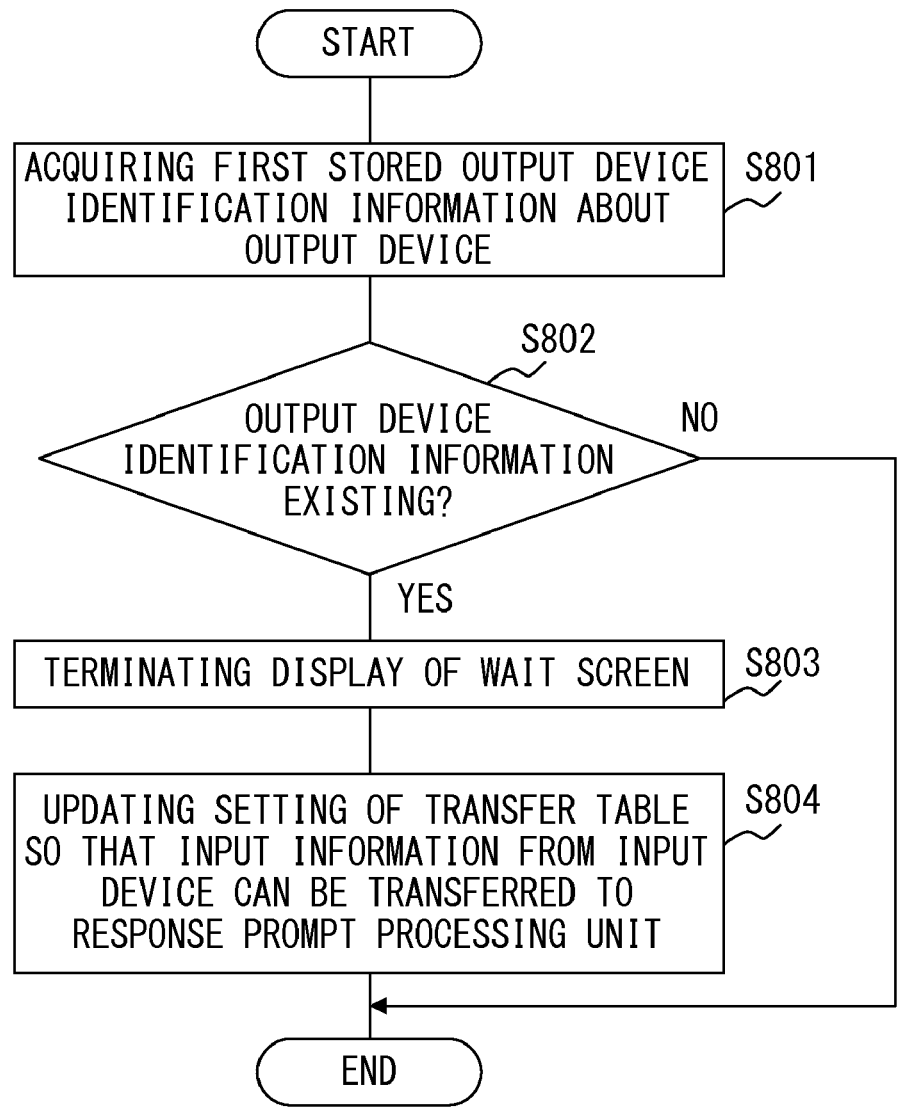
F I G. 16

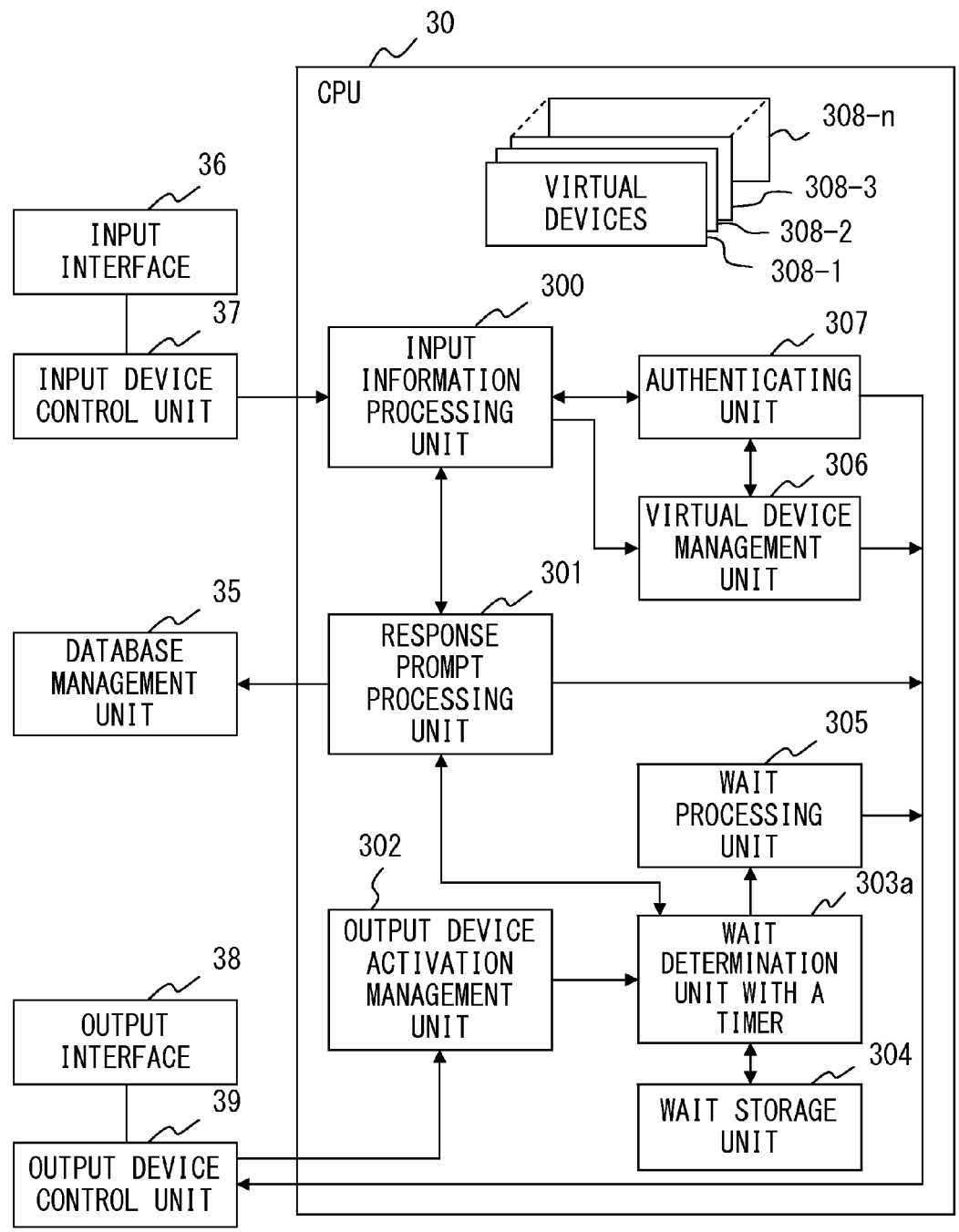
F I G. 17

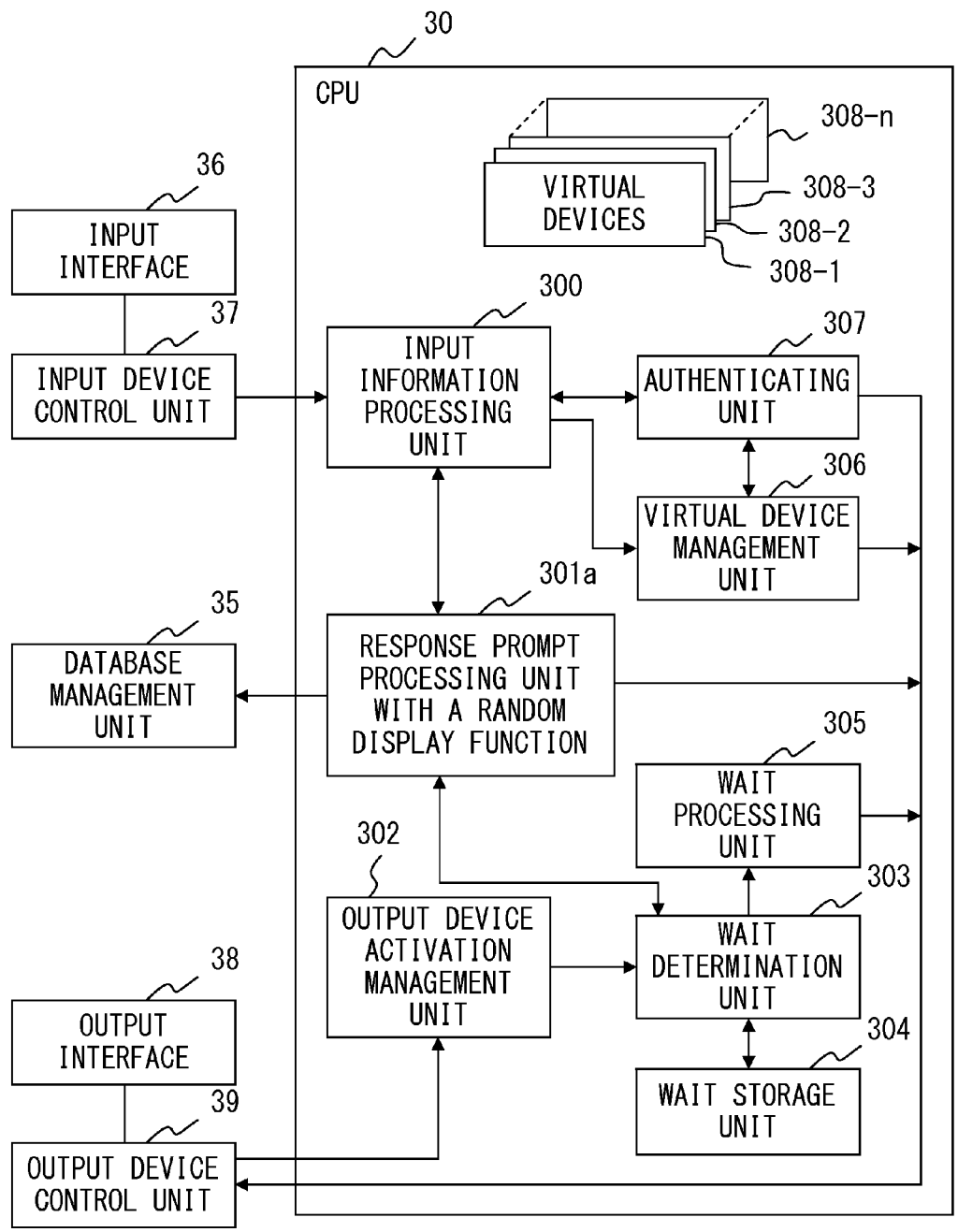
F I G. 20

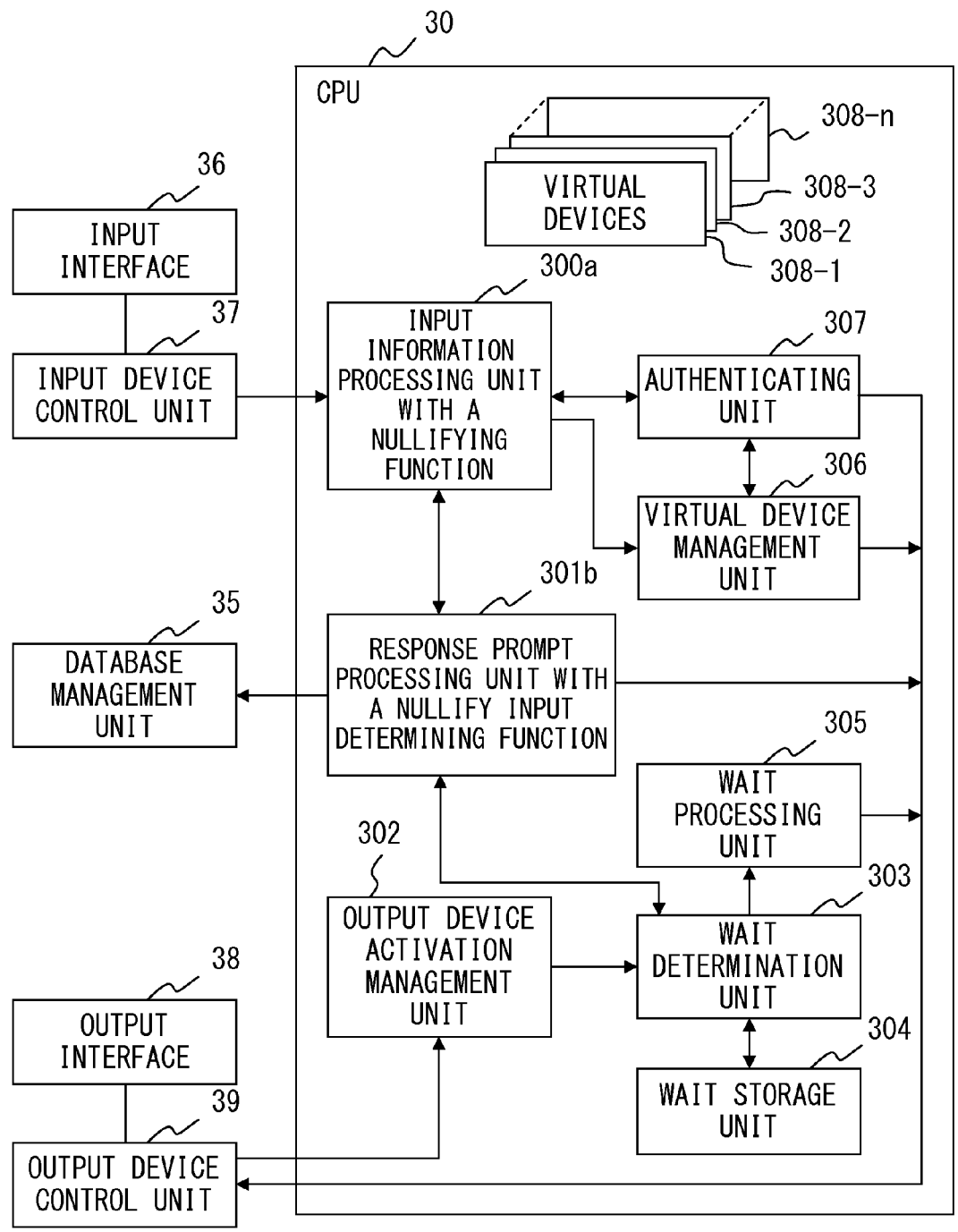
F I G. 21

INPUT-OUTPUT MANAGEMENT DEVICE AND INFORMATION PROCESSING DEVICE

CROSS-REFERENCE TO RELATED APPLICATIONS

This application is a continuation of PCT application PCT/JP2008/069910 which was filed on Oct. 31, 2008, the entire contents of which are incorporated herein by reference.

FIELD

The present invention relates to an input-output management device, an information processing device, and a computer-readable, non-transitory medium storing an input-output managing program for associating an input device used by each user with an output device when the information processing device in which a plurality of input devices are connected to a plurality of output devices is simultaneously used by a plurality of users.

BACKGROUND

Since the performance of a personal computer has been remarkable improved recently, there has occurred excess capacity for normal use. Accordingly, visualizing technology has been introduced to computers to utilize the excess capacity. The visualizing technology is to abstract a physical resource, divide it into a plurality of logical resources to assume a plurality of physical resources, assign one logical resource to each user in a plurality of users, and allows the plurality of users to use one computer.

As a result, for example, the resources of a plurality of computers are aggregated into the logical resources in one computer, thereby reducing the number of actually used computers and also reducing the number of installation locations, power consumption, and the load of maintenance management.

In addition, a computer has been provided with a number of terminal parts of USB (universal serial bus), for example, and a plurality of input devices such as a mouse, a keyboard, etc. can be connected. Furthermore, a plurality of output devices such as a liquid crystal display etc. can be connected to the computer to individually control display.

Additionally, in a conference system in which a large screen can be shared among a plurality of users as participants to individually use an input device, when each user uses a plurality of input devices such as a mouse, a keyboard, etc., the user operates a specific key of a keyboard while operating a mouse, thereby associating the mouse with the keyboard. This system is disclosed by, for example, Japanese Laid-open Patent Publication No. 2004-139419.

SUMMARY

According to an aspect of the invention, an input-output management device to which an input device and an output device are connected, and outputting to the output device a result of a process on input information received from the input device, includes a first connection device connecting a plurality of input devices; a second connection device connecting a plurality of output devices; a detection device detecting that an output device connected to the second connection device is activated; a display control device instructing the detected output device to display a response prompt screen requesting a response by an input device; and an association management device associating an input device which has returned a response with an output device displaying the response prompt screen based on a response by an input device connected to the first connection device on the response prompt screen.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a schematic diagram of the entire configuration of the information processing device and the peripheral equipment according to an embodiment of the present invention;

FIG. 3 illustrates the concept of an example of the format of the user-to-virtual-device association table stored in a database;

FIG. 4 illustrates the concept of an example of the format of the input device grouping table stored in a database;

FIG. 5 illustrates the concept of an example of the format of the input-output-device-to-virtual-device association table stored in a database;

FIG. 8 is an explanatory view of an example of input information;

FIG. 9 is a flowchart of the procedure of the associating process;

FIG. 15 is a flowchart of the procedure of the process performed by the input information processing unit according to an embodiment of the present invention;

FIG. 16 is a flowchart of the procedure of the wait releasing process performed by the wait determination unit according to an embodiment of the present invention;

FIG. 17 is a block diagram of the configuration of the input-output management device according to an embodiment of the present invention;

FIG. 20 is a block diagram of the configuration of the input-output management device according to an embodiment of the present invention;

FIG. 21 is a block diagram of the configuration of the input-output management device according to an embodiment of the present invention.

DESCRIPTION OF EMBODIMENTS

Since the above-mentioned prior system is to assign an input right to any of a plurality of user, it is not assumed that the plurality of users simultaneously press the specific keys of keyboards. Therefore, when the plurality of users simultaneously press the specific keys of keyboards, the computer cannot recognize the keyboard to be associated with the mouse. In addition, in the system above, there are a plurality of input devices, but one output device is shared among the plurality of users. Therefore, when each user individually uses the output device, it is not assumed that the input device used by each user is associated with the output device.

Embodiment 1

Figure 2:
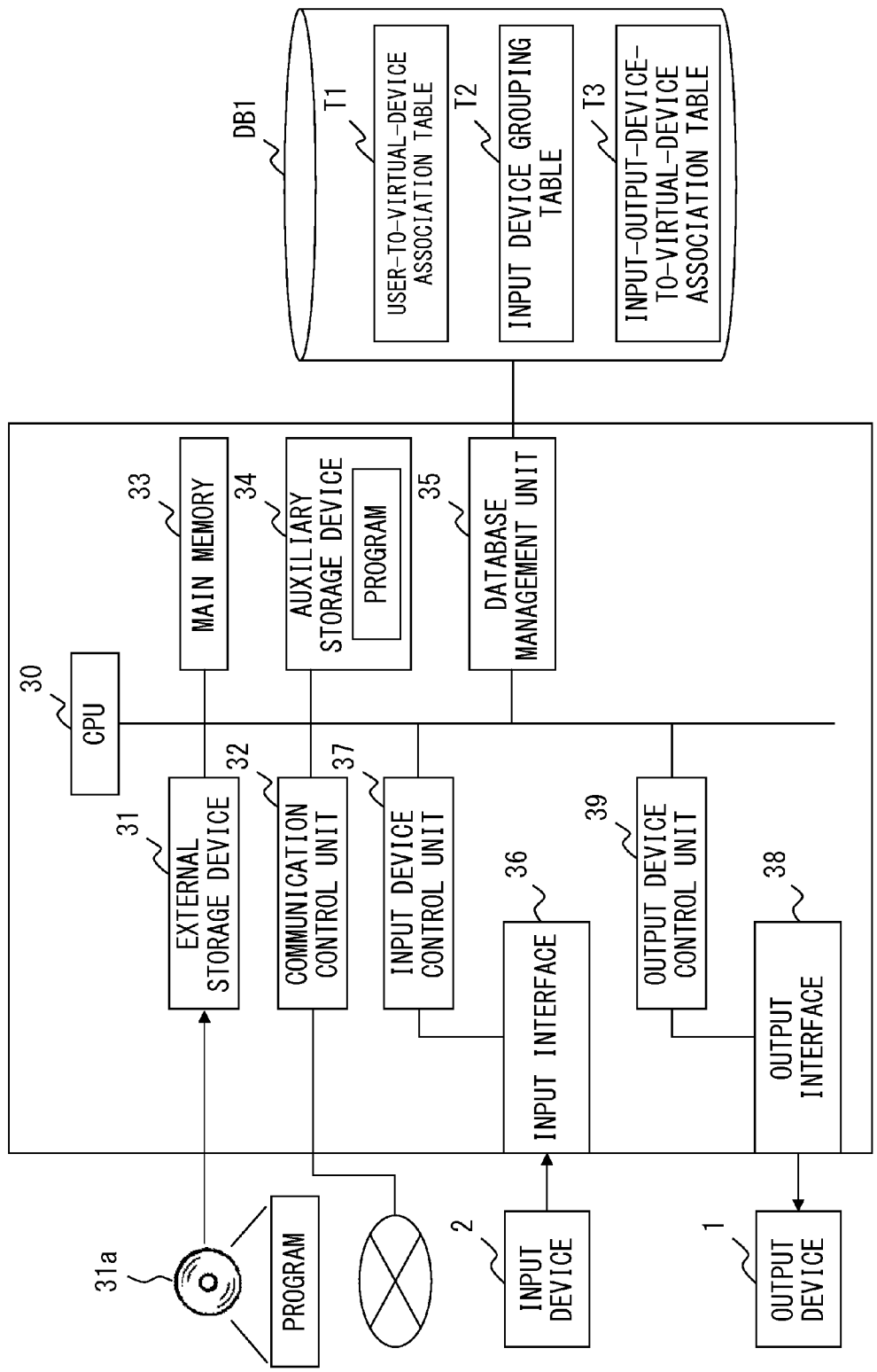
FIG. 2 is a block diagram of the configuration of the information processing device and the peripheral equipment according to an embodiment of the present invention.

The input-output management device, the information processing device, and the input-output managing program according to the embodiment 1 are described below with reference to the drawings of the embodiments. The embodiment 1 is described with reference to an example of applying the present invention to an information processing device having a virtual environment. FIG. 1 is a schematic diagram of the entire configuration of the information processing device and the peripheral equipment according to an embodiment of the present invention. FIG. 2 is a block diagram of the configuration of the information processing device and the peripheral equipment according to an embodiment of the present invention.

As illustrated in FIG. 1, a plurality of output devices 1 such as a liquid crystal display etc. and a plurality of input devices 2 such as a mouse, a keyboard, etc. can be connected to an information processing device 3 according to the embodiment 1. Each of the input devices 2 and the output devices 1 is operated by each user.

The information processing device 3 monitors the active state of the output device 1. When the information processing device 3 detects the activation of the output device 1, it instructs the output device 1 to display a response prompt screen for prompting the user to transmit a response using the input device 2. The user operates the input device 2 according to the instruction displayed on the response prompt screen by viewing the response prompt screen displayed on the output device 1. By the user operating the input device 2, the input device 2 transmits to the information processing device 3 the response information generated according to the operation performed by the user. Upon receipt of the response information from the input device 2, the information processing device 3 specifies the input device 2 operated by the user according to the received response information, and associates the specified input device 2 with the output device 1 which displays the response prompt screen.

In addition, when the information processing device 3 detects that the output device 1 has been activated and there is the output device 1 on which the response prompt screen is displayed (hereinafter referred to as a response prompted output device 1), the information processing device 3 can instruct the activated output device 1 to display await screen for information about wait for the completion of the process by another output device 1, and manage the process as wait for the completion of the process by another output device 1. In this case, after the input of the response information, the information processing device 3 instructs the output device 1 waiting for the completion of the process by another output device 1 to display the response prompt screen, thereby managing the device as a new response prompted output device 1.

The information processing device 3 is, for example, a personal computer, and a general-purpose unit for performing input-output management and other general information processing. The information processing device 3 includes as physical resources: a CPU 30; an external storage device 31 for reading information from an external record medium 31a; a communication control unit 32 for connection to a communication network; main memory 33 for temporarily storing data generated by performing a predetermined process; an auxiliary storage device 34 for storing a program for directing the CPU 30 to perform a predetermined process and other data; a database management unit 35 for connection to a database described later; an input interface 36 for connection of the input device 2; an input device control unit 37 for controlling the connection to the input device 2; an output interface 38 for connection of the input device 2; and an output device control unit 39 for controlling the connection to the output device 1. Each device is interconnected to other devices through a bus.

The external storage device 31 has an inlet (not illustrated in the attached drawings as the other components), and when the record medium 31a is inserted into the inlet, the device reads the program stored on the record medium 31a and outputs it to the auxiliary storage device 34. The external storage device 31 can be, for example, a flexible disk, a magneto optical disk, an optical disk, etc. The read program includes basic software (operating system) for using and managing the resources of the information processing device 3, and application software for executing a specific process. In addition, the basic software and the application software can function as one piece of software.

The communication control unit 32 communicates information with an external device by connection to a communication network under the control of the CPU 30. The communication control unit 32 can be, for example, a network card, a network card with a router function, etc.

The main memory 33 is a semiconductor memory device which stores plural pieces of information under the control of the CPU 30, and can read and write data regardless of the storing order, the storing position, etc., and stores the data generated by the CPU 30 performing a predetermined process. The main memory 33 is, for example, RAM.

The auxiliary storage device 34 stores the program and other data read from the record medium 31a, and appropriately reads them. The auxiliary storage device 34 is, for example, a hard disk of a magnetic storage system, a non-volatile semiconductor memory, etc.

The database management unit 35 communicates the information stored in the database described later under the control of the CPU 30. The database management unit 35 can be, for example, a database management system for management depending on the type of database or a database accessing interface. A database DB1 readable and writable by the database management unit 35 stores a user-to-virtual-device association table T1, an input device grouping table T2, and an input-output-device-to-virtual-device association table T3. The user-to-virtual-device association table T1 stores the information about the association between a user and virtual devices 308-1, 308-2, . . . , 308-n (refer to FIG. 6 described later). The input device grouping table T2 stores the information about the grouping of the input device 2. The input-output-device-to-virtual-device association table T3 stores the information about the association among the input device 2, the output device 1, and the virtual device. An example of the contents of each table is described later. In the present embodiment, the information in each table is stored in one database DB1, but the information can be stored after being distributed in a plurality of databases.

The input interface 36 is a terminal part for connecting a plurality of input devices 2, and has the functions of plug and play, hot plug, or hot swap. The input interface 36 communicates data with the input device 2 in accordance with the standards of, for example, the USB, the IEEE 1394, etc.

The input device control unit 37 groups a plurality of input devices 2 connected through the input interface 36 into a predetermined number of sections, and stores the grouping result in the input device grouping table T2. The input device control unit 37 can be, for example, a concentrator (hub), and there are a plurality of concentrators. A plurality of input devices 2 used by a user are grouped as one section by being connected to the same concentrator. The input device control unit 37 outputs the input information received from the input device 2 to the CPU 30. The input information according to the present embodiment includes input device identification information for identification of the input device 2, user operation information specific to the input device 2 (for example, movement information and click information of a mouse, pressing information about a keyboard, etc.), authentication information used in authenticating a user, etc.

The output interface 38 is a terminal part for connecting a plurality of output devices 1, and communicates data with the output device 1 in accordance with the standards of the DVI (digital visual interface) or the HDMI (high-definition multimedia interface) for transmitting a digital signal, or the VGA (video graphics array) terminal, etc. for transmitting an analog signal.

The output device control unit 39 individually controls the display of a plurality of output devices 1 connected through the output interface 38. The output device control unit 39 can be a graphics controller (GPU) unit or a graphics card having a GPU and dedicated memory. The output device control unit 39 individually controls the display of a plurality of output devices 1 using a performing card.

The CPU 30 performs input-output management based on the database DB1 and the data in the database DB1 according to the program stored in the auxiliary storage device 34. The CPU 30 performs general information processing.

Described below is the data used by the CPU 30. FIG. 3 illustrates the concept of an example of the format of the user-to-virtual-device association table T1 stored in a database DB1. The user-to-virtual-device association table T1 stores the identification information about a user, the password of the user, and the identification information about a virtual device after associating them. The user identification information is set in advance by an administrator during the entry of the user. The password is set by an administrator or a user during the entry of the user. The virtual device identification information is automatically set by an administrator during the generation of a virtual device or during the entry of a user, and appropriately associated with user identification information.

FIG. 4 illustrates the concept of an example of the format of the input device grouping table T2 stored in a database DB1. The input device grouping table T2 stores a grouping number assigned to each section, the input device identification information about the input device 2, and the input device type information about the input device 2 after associating them.

The input device identification information is uniquely assigned by basic software each time the input device control unit 37 detects the connection of the input device 2. In addition, the input device type information is detected by basic software each time the input device control unit 37 detects the connection of the input device 2, and is classified into, for example, a mouse, a keyboard, a concentrator, etc. In addition, when the input device 2 is detected, a combination of a concentrator and the input device 2 connected to the concentrator is detected. The grouping number is set in advance by an administrator based on the combination of the detected concentrator and the input device 2 connected to the concentrator. In FIG. 4, for example, the concentrator having the input device identification information of "0x1000-0000" and, as the input device 2 connected to the concentrator, the keyboard having the input device identification information of "0x1000-0001" and the mouse having the input device identification information of "0x1000-0002" are detected as a combination. The administrator sets the grouping number "Group 0" for the communicated having the input device identification information of "0x1000-0000", the keyboard having the input device identification information of "0x1000-0001", and the mouse having the input device identification information of "0x1000-0002". Similarly, the administrator sets the grouping numbers "Group 1", "Group 2", . . . using a detected combination as one unit.

FIG. 5 illustrates the concept of an example of the format of the input-output-device-to-virtual-device association table T3 stored in a database DB1. The input-output-device-to-virtual-device association table T3 stores the input device identification information about the input device 2, the output device identification information about the output device 1, and the virtual device identification information about a virtual device after associating them. The input device identification information about the detected input device 2 entered in the input device grouping table T2 is used as the input device identification information. The output device identification information is uniquely assigned by basic software each time the output device control unit 39 detects the connection of the output device 1. The virtual device identification information is the identification information assigned to a virtual device operable by the information processing device 3, and the data entered in the user-to-virtual-device association table T1 is used. When there is no virtual device to be associated, the virtual device identification information indicates "NULL". The input-output-device-to-virtual-device association table T3 is stored in the database DB1 although the power supply to the information processing device 3 is stopped, and is used in the information processing device 3 to be activated next.

Figure 6:
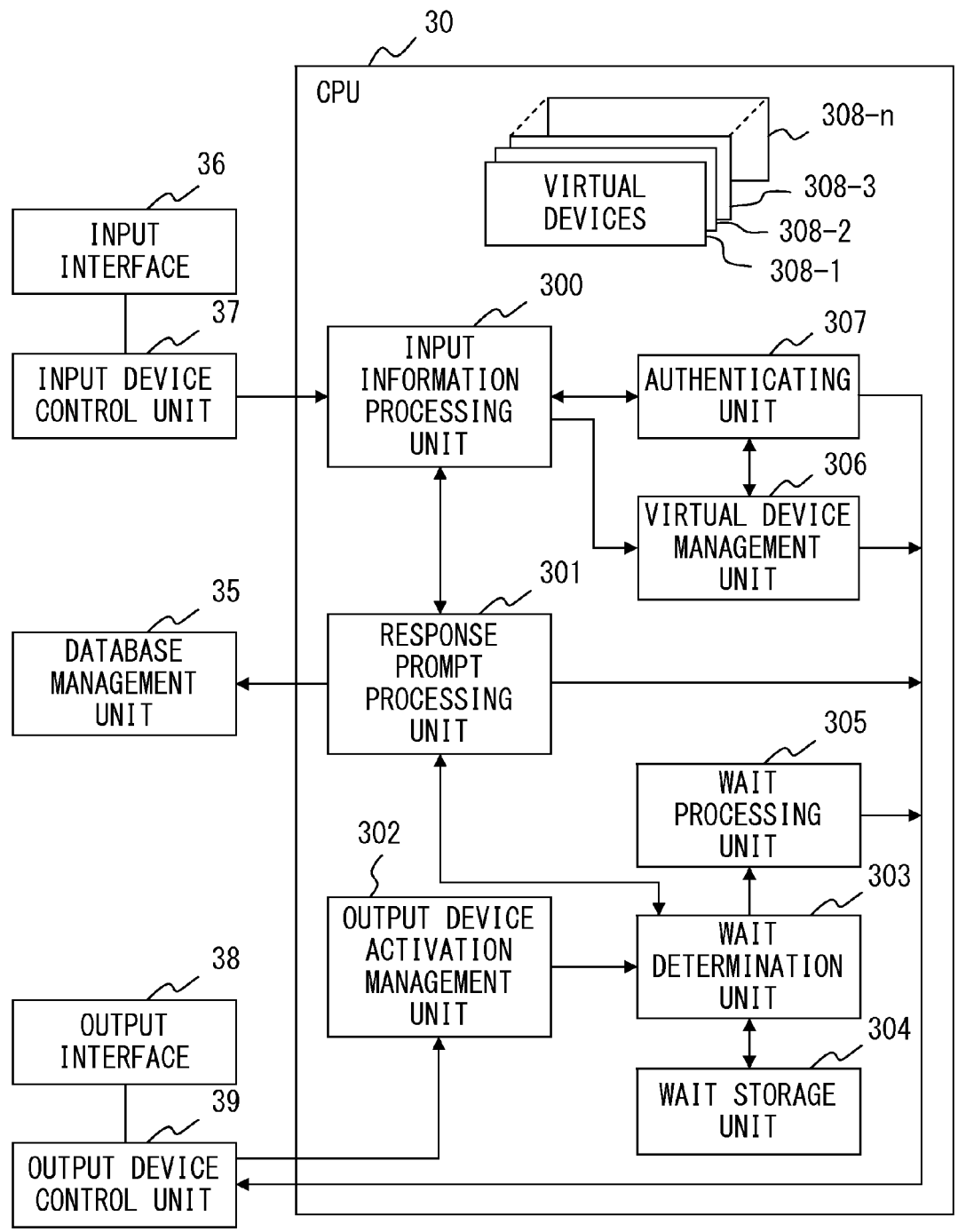
FIG. 6 is a block diagram of the configuration of the input-output management device according to an embodiment of the present invention.

FIG. 6 is a block diagram of the configuration of the input-output management device according to an embodiment of the present invention. In the devices included in the above-mentioned information processing device 3, the CPU 30, the database management unit 35, the input interface 36, the input device control unit 37, the output interface 38, and the output device control unit 39 function as part of the input-output management device.

The CPU 30 as an input-output management device functions as an input information processing unit 300, a response prompt processing unit 301, an output device activation management unit 302, a wait determination unit 303, a wait storage unit 304, a wait processing unit 305, a virtual device management unit 306 for managing virtual devices 308-1, 308-2, . . . , 308-n, an authenticating unit 307, and the virtual devices 308-1, 308-2, . . . , 308-n.

The input information processing unit 300 processes input information. The input information processing unit 300 receives the input information about the contents input by the input device 2 through the input device control unit 37. For example, when the input device 2 is a mouse, the input information is the identification information of the mouse, the information about the operation contents of the mouse such as right click etc, and the coordinates indicating the position of the mouse cursor on the display surface of the output device 1 when the operation of the mouse is performed. The input information processing unit 300 transfers the received input information to each unit of the CPU 30 according to the data in a transfer table (not illustrated in the attached drawings). The transfer table is stored in the auxiliary storage device 34, and stores the transfer settings set by each unit of the CPU 30. The transfer table stores the name of the process unit to which the received input information is to be transferred when the input information from each input device 2 is received. The initial value of the transfer table is set in the response prompt processing unit 301.

The response prompt processing unit 301 associates the output device 1 with the input device 2. The response prompt processing unit 301 allows the output device 1 reported from the wait determination unit 303 to display the response prompt screen. When a user performs a response inputting operation using the input device 2 according to an instruction on the response prompt screen displayed on the display surface of the output device 1, the input information depending on the response inputting operation is generated and transmitted. Upon receipt of the input information transmitted from the input device 2, the input information processing unit 300 transfers the input information to the response prompt processing unit 301 according to the setting of the transfer table.

Upon receipt of the input information transferred from the input information processing unit 300, the response prompt processing unit 301 determines whether or not the received input information is response information indicating the response on the response prompt screen. When the response prompt screen requests the click of the button displayed at a predetermined position by the mouse as the input device 2, the response prompt processing unit 301 makes a determination depending on the contents of the operation of the mouse indicated by the input information and whether or not the operation is performed within the range of the predetermined coordinates on the display surface of the output device 1. When the response prompt screen requests to input a character string by a keyboard, for example, it makes a determination depending on depending on the contents of the operation of the keyboard indicated by the input information and whether or not the character string input by the keyboard is the same as the contents requested on the response prompt screen.

When the response prompt processing unit 301 determines that the input information is response information, it searches the input device grouping table T2 according to the input device identification information about the input device 2 included in the input information, and designates the grouping number corresponding to the input device identification information about the input device 2. The response prompt processing unit 301 searches the input device grouping table T2, and acquires the input device identification information about the input device 2 associated with the same grouping number as the designated grouping number. The response prompt processing unit 301 associates the acquired input device identification information about the input device 2 with the output device identification information about the output device 1, and stores it in the input-output-device-to-virtual-device association table T3. The response prompt processing unit 301 notifies the input information processing unit 300 and the wait determination unit 303 of the completion of the process.

The output device activation management unit 302 detects that the input device 2 has been activated. The output device activation management unit 302 periodically acquires a signal from the output device 1 connected to the output interface 38, and monitors the activation state of the output device 1. The output device activation management unit 302 designates a newly activated output device 1 based on the acquired activation state of the output device 1, and requests the display of the response prompt screen on the output device 1 designated by the wait determination unit 303.

The wait determination unit 303 determines whether or not there is an output device 1 waiting for the completion of the process by another output device 1. When a request from the output device activation management unit 302 is received, the wait determination unit 303 determines whether or not there is a response prompted output device 1. When the wait determination unit 303 determines that there is a response prompted output device 1, it requests the wait processing unit 305 to display a wait screen indicating another user is performing the process, and notifies the wait storage unit 304 of the output device identification information about the output device 1.

On the other hand, when the wait determination unit 303 determines that there is no response prompted output device 1, it requests the response prompt processing unit 301 to display the response prompt screen. Upon receipt of the notification from the response prompt processing unit 301 that the process has been completed, the wait determination unit 303 terminates the display of the wait screen displayed on the output device 1 waiting for the completion of the process by another output device 1, and requests the response prompt processing unit 301 to display the response prompt screen. In addition, the wait determination unit 303 notifies the wait storage unit 304 of the solution of the wait state together with the output device identification information about the output device 1.

The wait storage unit 304 stores the output device identification information about the output device 1 waiting for the completion of the process by another output device 1. The wait storage unit 304 stores the output device identification information about the output device 1 to be displayed on the wait screen notified from the wait determination unit 303 in the storage data (not illustrated in the attached drawings) in the auxiliary storage device 34. The wait storage unit 304 deletes from the storage data in the auxiliary storage device 34 the output device identification information about the output device 1 whose wait state has been solved as notified from the wait determination unit 303.

The wait processing unit 305 displays the wait screen on the output device 1. Upon receipt of the output device identification information about the output device 1 and a display request from the wait determination unit 303, the wait processing unit 305 displays the wait screen on the output device 1 corresponding to the received identification information.

The virtual device management unit 306 abstracts the physical resources of the information processing device 3 according to the program stored in the auxiliary storage device 34, and makes the resources look as if they were a plurality of logical resources, thereby performing a plurality of virtual devices 308-1, 308-2, ..., 308-n. Upon receipt of a request from the authenticating unit 307, the virtual device management unit 306 assigns the output device 1 and the input device 2 to any of the virtual devices 308-1, 308-2, . . . , 308-*n* based on the input-output-device-to-virtual-device association table T3. Upon receipt of the input information from the input device 2 transferred from the input information processing unit 300, the virtual device management unit 306 transfers the received input information from the input device 2 to the virtual devices 308-1, 308-2, . . . , 308-*n*. The virtual device performs general information processing according to the program stored in the auxiliary storage device 34.

After the response prompt processing unit 301 associates the input device 2 with the output device 1, the authenticating unit 307 displays the authentication screen for authentication of a user on the display surface of the output device 1 for which the association has been completed. By the user inputting the information for authentication according to an instruction on the authentication screen, the input authentication information is reported to the input information processing unit 300. The input information processing unit 300 transfers the reported authentication information to the authenticating unit 307 based on the transfer table. Upon receipt of the authentication information transferred from the input information processing unit 300, the authenticating unit 307 determines whether or not the received authentication information has been stored in the user-to-virtual-device association table T1, thereby performing authentication as to whether or not the user has a use right of the information processing device 3. When the received authentication information is stored in the user-to-virtual-device association table T1, the authenticating unit 307 recognizes successful authentication, and requests the virtual device management unit 306 to perform the virtual device.

Figure 7A:
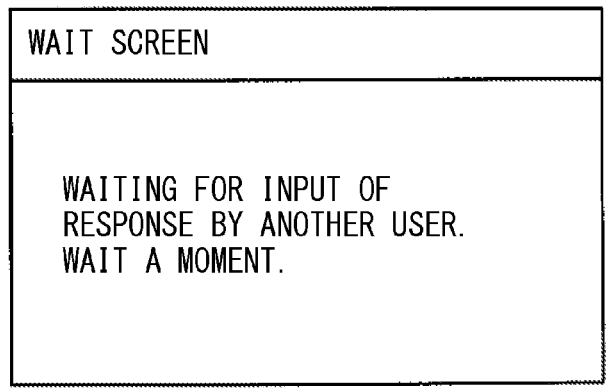
FIGS. 7A, 7B and 7C are schematic diagrams of examples of the screen displayed on the output device according to an embodiment of the present invention.
Figure 7B:
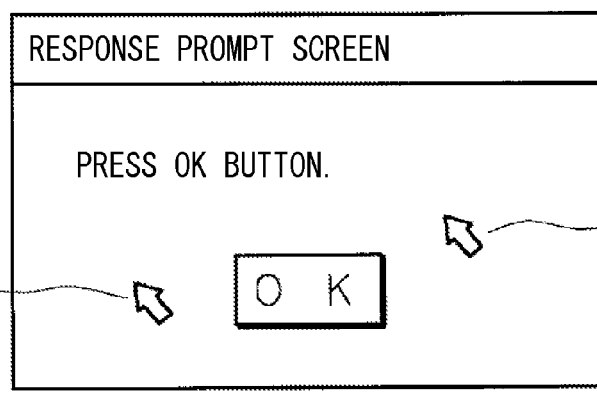
Figure 7C:
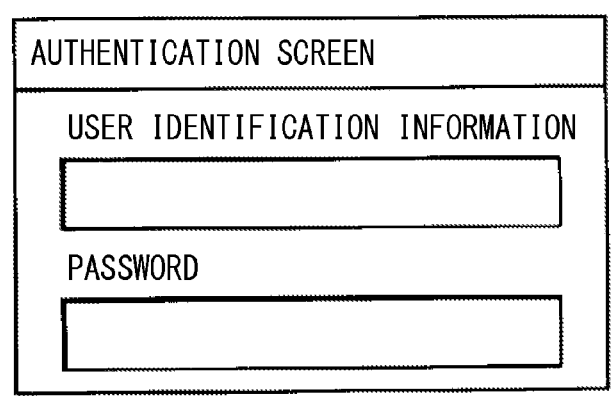

By controlling the output device control unit 39, the CPU 30 displays a wait screen, a response prompt screen, or an authentication screen on the output device 1 according to an instruction from each processing unit. FIGS. 7A, 7B and 7C are schematic diagrams of examples of the screen displayed on the output device 1 according to an embodiment of the present invention. FIG. 8 is an explanatory view of an example of input information. Since a wait screen is waiting for the input by another output device 1 on the response prompt screen, it is reported that the screen cannot be operated at present (FIG. 7A).

The response prompt screen instructs a user to perform an inputting operation using the input device 2. In the present embodiment, on the response prompt screen, for example, an "OK button" is displayed with the message requesting to click the "OK button by a user using a mouse" (FIG. 7B). The display position of the OK button is set and fixed in advance. When a user operates the input device 2, the input information is generated depending on the contents of the operation of the user.

For example, when the user moves a mouse, the information about the movement of the mouse and the coordinates of the mouse cursor displayed after the movement of the mouse on the display surface of the output device 1 are generated as input information (refer to FIG. 8). In addition, for example, when the left button of a mouse is clicked, the information about the click of the left button of the mouse is generated as input information. The generated input information is output to the information processing device 3. In the present embodiment, the input information includes the input device identification information about the input device 2, an event, and an argument. The input device identification information about the input device 2 on which the inputting operation by a user is set in the input device identification information about the input device 2. The information indicating the contents of the operation performed by the input device 2 is set in the event. The complementary information about the operation performed by the input device 2 is set in the argument.

The authentication screen requests a user to be authenticated to input authentication information (FIG. 7C). The authentication information includes identification information and a password. The password is set by an administrator or a user during the entry of the user. The user identification information is output to the information processing device 3 when the password corresponding to the user identification information is input to the input column.

The CPU 30 associates the output device 1 with the input device 2 using the above-mentioned functions. FIG. 9 is a flowchart of the procedure of the associating process. The output device activation management unit 302 periodically acquires a signal from the output device 1 connected to the output interface 38 through the output device control unit 39, and determines whether or not the output device 1 has been newly activated (S101). When the output device activation management unit 302 of the CPU 30 determines that the output device 1 has not been newly activated (NO in S101), control is returned to step S101, and the process is repeated.

On the other hand, when the output device activation management unit 302 of the CPU 30 determines that the output device 1 has been newly activated (YES in S101), it notifies the wait determination unit 303 of the output device identification information about the newly activated output device 1. The wait determination unit 303 determines whether or not the response prompt screen is displayed on the output device 1 difficult from the output device 1 notified from the output device activation management unit 302 and newly activated (S102). When the wait determination unit 303 of the CPU 30 determines that the response prompt screen is displayed on another output device 1 (YES in S102), it notifies the wait processing unit 305 of the output device identification information about the newly activated output device 1. The wait processing unit 305 displays a wait screen on the newly activated output device 1 according to the output device identification information about the output device 1 notified by the wait determination unit 303 (S103). The wait determination unit 303 of the CPU 30 stores the output device identification information about the newly activated output device 1 in the storage data of the wait storage unit 304 (S104). The CPU 30 repeats the process after returning to step S101.

On the other hand, when the wait determination unit 303 determines that the response prompt screen has not been displayed on another output device 1 (NO in S102), it notifies the response prompt processing unit 301 of the output device identification information about the newly activated output device 1. The response prompt processing unit 301 displays the response prompt screen on the newly activated output device 1 according to the output device identification information about the output device 1 notified by the wait determination unit 303 (S105). Upon receipt of the input information from the input device 2, the input information processing unit 300 of the CPU 30 transfers the input information to the CPU response prompt processing unit 301 based on the setting of the transfer table. The response prompt processing unit 301 determines whether or not the transferred input information is the response information to the response prompt screen displayed on the output device 1 (S106). When the response prompt processing unit 301 determines that the received input information is not response information (NO in S106), control is returned to step S106, and the process is repeated.

When the response prompt processing unit 301 determines that the received input information is response information (YES in S106), it associates the input device 2 to which the response information is input with the output device 1 on which the response prompt screen is displayed (S107), and stores the association result in the input-output-device-to-virtual-device association table T3.

Furthermore, the response prompt processing unit 301 searches the input device grouping table T2 according to the input device identification information about the input device 2 in which response information is input, and designates the grouping number associated with the input device identification information about the input device 2 (S108). The response prompt processing unit 301 extracts the input device identification information about another input device 2 associated with the designated grouping number (S109). The response prompt processing unit 301 associates the input device identification information about the other designated input device 2 with the output device identification information about the output device 1 on which the response prompt screen is displayed (S110), and the associated identification information in the input-output-device-to-virtual-device association table T3.

Concretely described below is an example in which the output device identification information about the output device 1 on which the response prompt screen is displayed is "0x0000-0000" and the input device identification information about the input device 2 used when input is performed on the response prompt screen is "0x1000-0001".

In step S107, as illustrated in FIG. 5, the response prompt processing unit 301 associates the input device identification information "0x1000-0001" of the input device 2 used when input is performed on the response prompt screen with the output device identification information "0x0000-0000" of the output device 1 on which the response prompt screen is displayed, and stores the association result in the input-output-device-to-virtual-device association table T3. In step S108, the response prompt processing unit 301 searches the input device grouping table T2 based on the input device identification information "0x1000-0001" of the input device 2 used when input is performed on the response prompt screen, and designates the grouping number associated with the input device identification information "0x1000-0001". In the example in FIG. 4, the grouping number associated with the input device identification information "0x1000-0001" is "Group 0".

Next, the response prompt processing unit 301 searches the input device grouping table T2 again based on the designated grouping number "Group 0", and confirms whether or not the input device 2 having the information other than the input device identification information of "0x1000-0001" is associated with the same grouping number and stored. In the example illustrated in FIG. 4, the grouping number "Group 0" stores the input device 2 (keyboard) having the input device identification information "0x1000-0001" associated with the input device 2 (mouse) having the input device identification information "0x1000-0002". The response prompt processing unit 301 extracts the input device 2 (mouse) having the input device identification information "0x1000-0002" as the input device 2 stored as associated with the grouping number "Group 0". The response prompt processing unit 301 associates the input device identification information "0x1000-0002" of the extracted input device 2 with the input device identification information "0x0000-0000" of the output device 1 on which the response prompt screen is displayed, and stores the association result in the input-output-device-to-virtual-device association table T3.

In addition, the response prompt processing unit 301 notifies the input information processing unit 300 that the associating process between the input device 2 and the output device 1 has been completed (S111). Upon receipt of the notification that the associating process has been completed from the response prompt processing unit 301, the input information processing unit 300 notifies the authenticating unit 307 of the output device identification information about the output device 1 for which the associating process has been completed and the input device identification information about the input device 2 (S112). The CPU 30 terminates the associating process.

Figure 10:
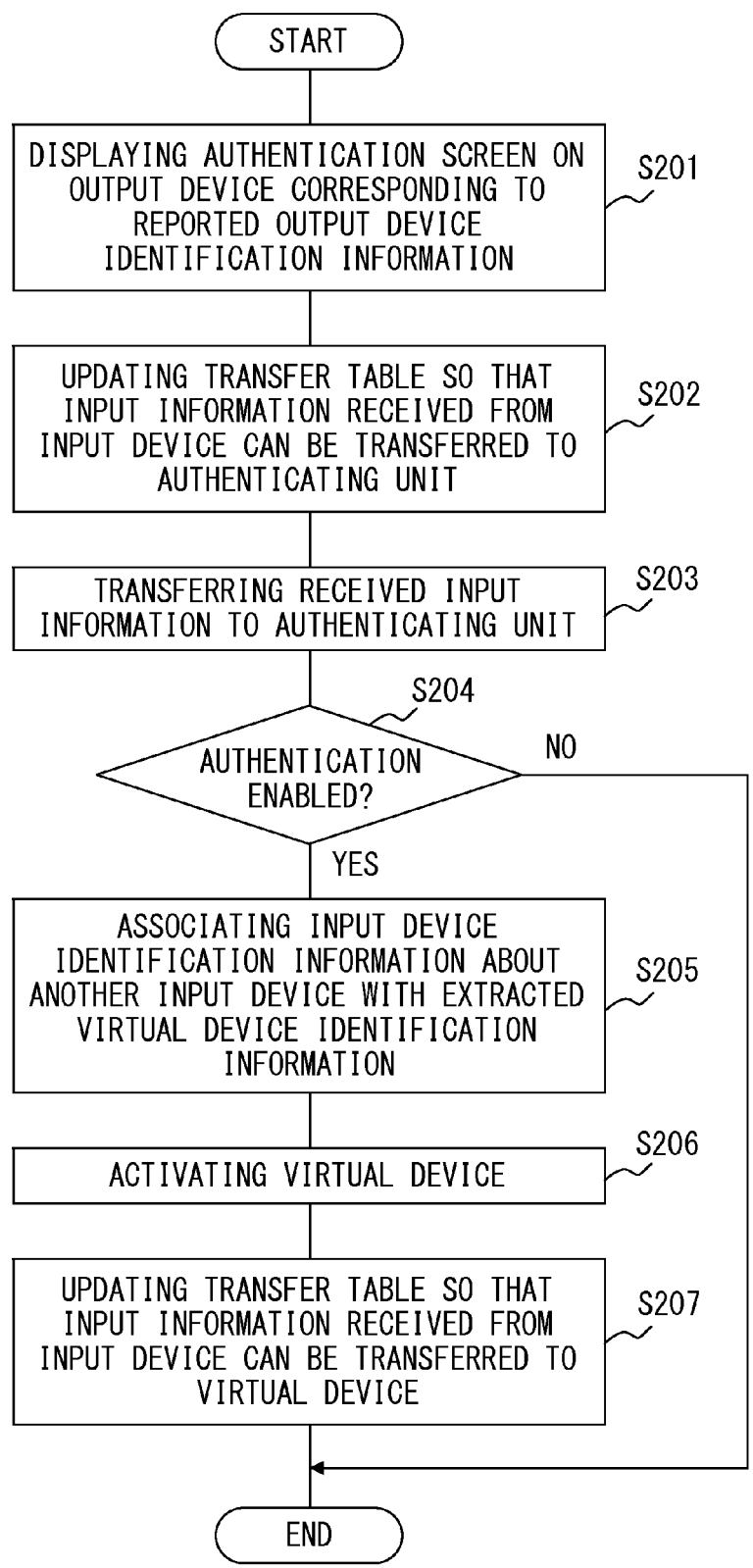
FIG. 10 is a flowchart of the procedure of the authenticating process.

After the associating process between the output device 1 and the input device 2 by the response prompt processing unit 301 is completed, the authenticating unit 307 of the CPU 30 performs the authentication as to whether or not a user using the source input device 2 has a use right. FIG. 10 is a flowchart of the procedure of the authenticating process.

The authenticating unit 307 of the CPU 30 allows the output device 1 corresponding to the output device identification information notified from the input information processing unit 300 to display an authentication screen (S201). The authentication screen is a screen as illustrated in FIG. 7C as described above. The authenticating unit 307 of the CPU 30 updates the transfer table so that the input information received from the input device 2 notified from the input information processing unit 300 can be transferred to the authenticating unit 307 (S202). When the user identification information and the password on the authentication screen are input using the input device 2, the contents of the input user identification information and the contents of the password are reported as the input information from the input device 2 to the information processing device 3.

Upon receipt of the input information from the input device 2, the input information processing unit 300 of the CPU 30 transfers the received input information to the destination of the transfer associated with the input device identification information about the input device 2, that is, the authenticating unit 307 (S203) based on the setting of the transfer table.

The authenticating unit 307 determines whether or not the authentication can be performed based on the transferred input information, that is, the user identification information and the password (S204). The authenticating unit 307 of the CPU 30 determines whether or not the transferred user identification information is stored in the user-to-virtual-device association table T1. When the user identification information is not stored in the user-to-virtual-device association table T1, the authenticating unit 307 determines that the authentication cannot be performed. In addition, when the user identification information is stored in the user-to-virtual-device association table T1, the authenticating unit 307 determines whether or not the transferred password matches the password stored as associated with the user identification information about the user-to-virtual-device association table T1. When the transferred password does not match the password stored as associated with the user identification information about the user-to-virtual-device association table T1, the authenticating unit 307 determines that the authentication cannot be performed. When the transferred password matches the password stored as associated with the user identification information about the user-to-virtual-device association table T1, the authenticating unit 307 determines that the authentication has been successfully performed.

When it is determined that the authentication cannot be performed (NO in S204), the authenticating unit 307 terminates the authenticating process by the authenticating unit 307. In this case, the authentication can be performed for a predetermined frequency at which the authentication information can be reentered. In this case, when the frequency at which it is described that the authentication cannot be performed reaches the predetermined frequency, the process by the authenticating unit 307 terminates. The authenticating process by the authenticating unit 307 is not limited to the process using a password. A password can be replaced with vio-authentication using bio-information such as a fingerprint, a palm print, an iris, a voice print, a face image, etc., authentication using an IC card, an ID card, etc. These authenticating systems can be used in combination.

On the other hand, when the authenticating unit 307 of the CPU 30 determines that the authentication can be performed (YES in S204), the virtual device identification information corresponding to the received user identification information is extracted from the user-to-virtual-device association table T1. The authenticating unit 307 searches the input device grouping table T2 according to the input device identification information about the source input device 2 to which the user identification information has been input, and designates the grouping number corresponding to the input device identification information. The authenticating unit 307 extracts the input device identification information about another input device 2 stored as associated with the same grouping number as the designated grouping number. The authenticating unit 307 associates the input device identification information about the source input device 2 with the extracted virtual device identification information, and stores the association result in the input-output-device-to-virtual-device association table T3.

In addition, the authenticating unit 307 associates the extracted input device identification information about another input device 2 with the extracted virtual device identification information (S205), and the associated identification information is stored in the input-output-device-to-virtual-device association table T3. The virtual device management unit 306 of the CPU 30 activates the virtual devices 308-1, 308-2, . . . , 308-n indicated by the extracted virtual device identification information (S206). The virtual device management unit 306 of the CPU 30 updates the transfer table (S207) so that the input information received from the source input device 2 and the extracted input device 2 can be transferred to the virtual devices 308-1, 308-2, . . . , 308-n, thereby terminating the authenticating process.

Afterwards, the virtual devices 308-1, 308-2, . . . , 308-n of the CPU 30 performs the information processing according to the input information from the input device 2 with which the virtual devices 308-1, 308-2, . . . , 308-n are associated. The procedure of the process performed by the CPU 30 as an input-output management device is described above.

Figure 11:
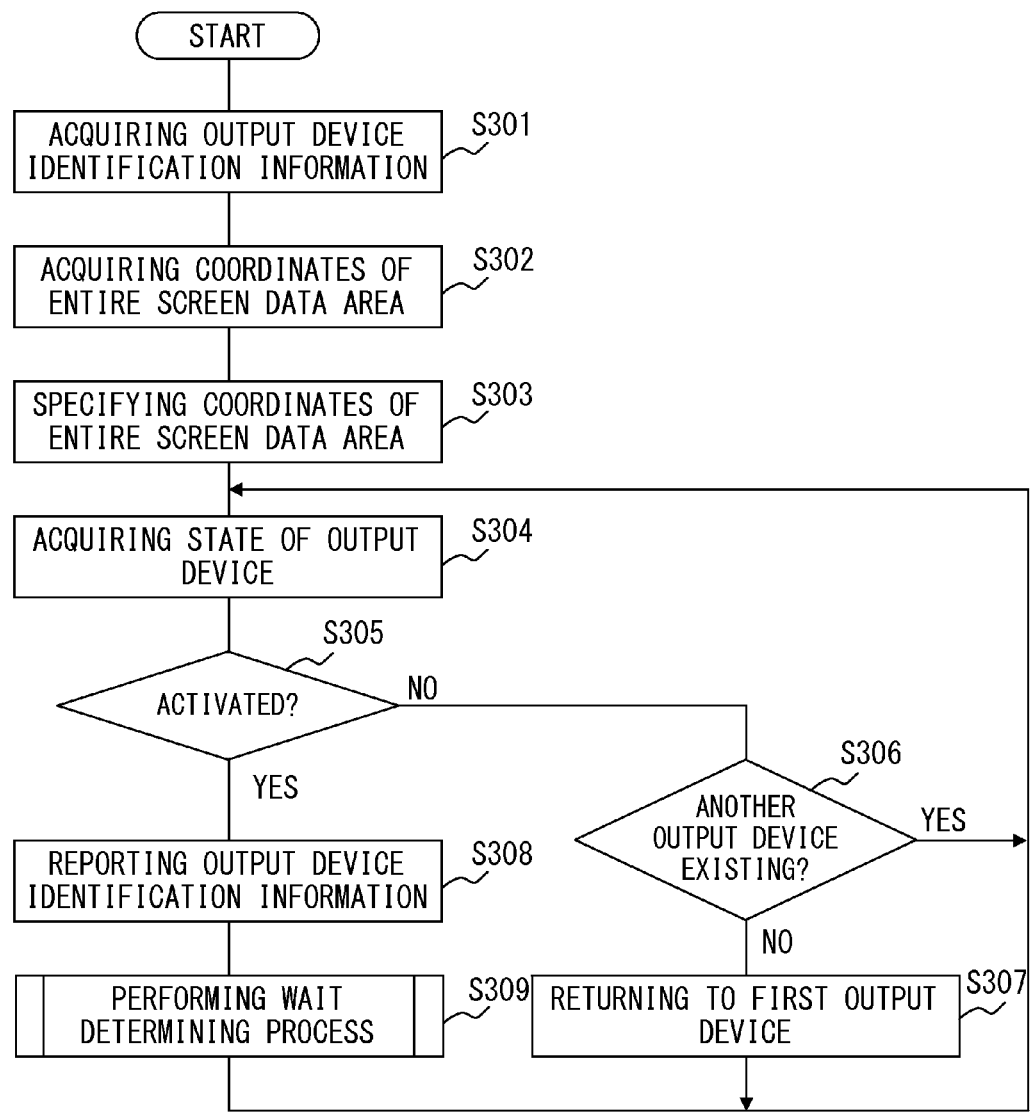
FIG. 11 is a flowchart of the procedure of the process performed by the output device activation management unit according to an embodiment of the present invention.

Described next is each function of the procedure of the process performed by the CPU 30. First, the procedure of the process performed when the CPU 30 functions as the output device activation management unit 302. FIG. 11 is a flowchart of the procedure of the process performed by the output device activation management unit 302 in an embodiment of the present invention.

The output device activation management unit 302 of the CPU 30 acquires the output device identification information from the connected output device 1 each time the output device 1 is connected to the output interface 38 (S301). Furthermore, in the entire screen data area (not illustrated in the attached drawings) storing the display data of each output device 1, the coordinates of the entire screen data area corresponding to the newly acquired output device 1 are acquired (S302). The CPU 30 associates the coordinates of the entire screen data area of the acquired output device 1 with the output device identification information and stores the association result in the list (not illustrated in the attached drawings) generated in the auxiliary storage device 34.

The output device activation management unit 302 of the CPU 30 specifies the coordinates of the entire screen data area stored in the list (S303). The output device activation management unit 302 of the CPU 30 specifies one of the output devices 1 whose output device identification information is stored in the list, and acquires the state of the specifies output device 1 (S304). Furthermore, it determines whether or not the specified output device 1 has been activated (S305). When the output device activation management unit 302 of the CPU 30 determines that the output device 1 has not been activated (NO in S305), it determines whether or not there is another output device 1 having the output device identification information stored in the list (S306). If the output device activation management unit 302 of the CPU 30 determines that there is another output device 1 having the output device identification information stored in the list (YES in S306), control is returned to step S304, and it is determined whether or not the next output device 1 stored in the list has been activated.

On the other hand, when the output device activation management unit 302 of the CPU 30 determines that there is no another output device 1 having identification information in the list (NO in S306), control is returned to the first output device 1 storing the identification information in the list (S307), control is returned to step S304, and it is determined whether or not the first output device 1 stored in the list has been activated.

In the meantime, when the output device activation management unit 302 of the CPU 30 determines that the specified output device 1 has been activated (YES in S305), the output device identification information about the specified output device 1 is reported to the wait determination unit 303 (S308). The wait determination unit 303 performs the wait determining process (S309). The CPU 30 returns control to step S304, and determines whether or not the next output device 1 stored in the list has been activated.

Figure 12:
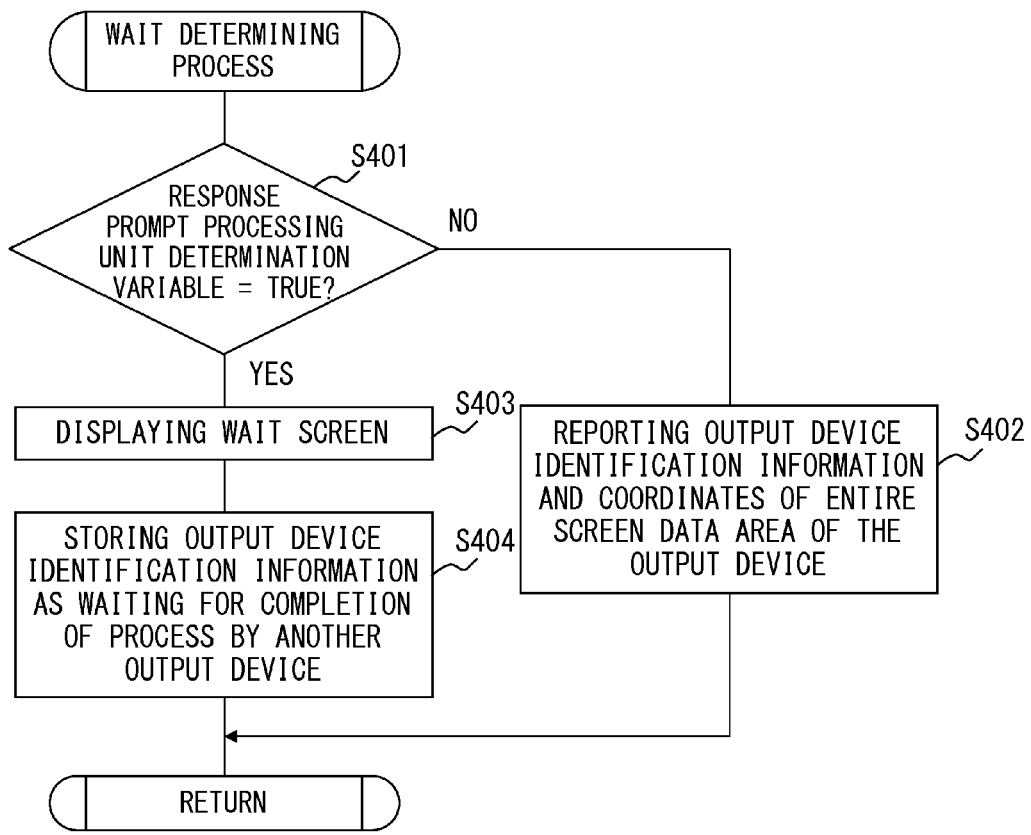
FIG. 12 is a flowchart of the procedure of the wait determining process.

Next, the wait determining process performed in step S309 is described. FIG. 12 is a flowchart of the procedure of the wait determining process.

The wait determination unit 303 of the CPU 30 determines whether or not a response prompt processing unit determination variable indicating whether or not another output device 1 is associated with the input device 2 is "true" in the response prompt processing unit 301 (S401). If the wait determination unit 303 of the CPU 30 determines that the response prompt processing unit determination variable is not "true" (NO in S401), it notifies the response prompt processing unit 301 of the output device identification information about the output device 1 which is determined as being newly activated and the coordinates of the entire screen data area of the output device 1 (S402). The CPU 30 waits until the request for the next performance of the process is received.

On the other hand, when the wait determination unit 303 of the CPU 30 determines that the response prompt processing unit determination variable is "true" (YES in S401), it determines that there is a response prompted output device 1, and notifies the wait processing unit 305 of the output device identification information about the output device 1 determined as a newly activated device and the coordinates of the entire screen data area of the output device 1. The wait processing unit 305 allows the output device 1 determined as newly activated to display a wait screen according to the output device identification information about the output device 1 notified by the wait determination unit 303 and determined as newly activated and the coordinates of the entire screen data area of the output device 1 (S403).

The wait determination unit 303 of the CPU 30 stores in the wait storage unit 304 the output device identification information about the output device 1 displaying await screen as waiting for the completion of the process by another output device 1 (S404). The CPU 30 waits for the reception of a request for the next process execution.

Figure 13:
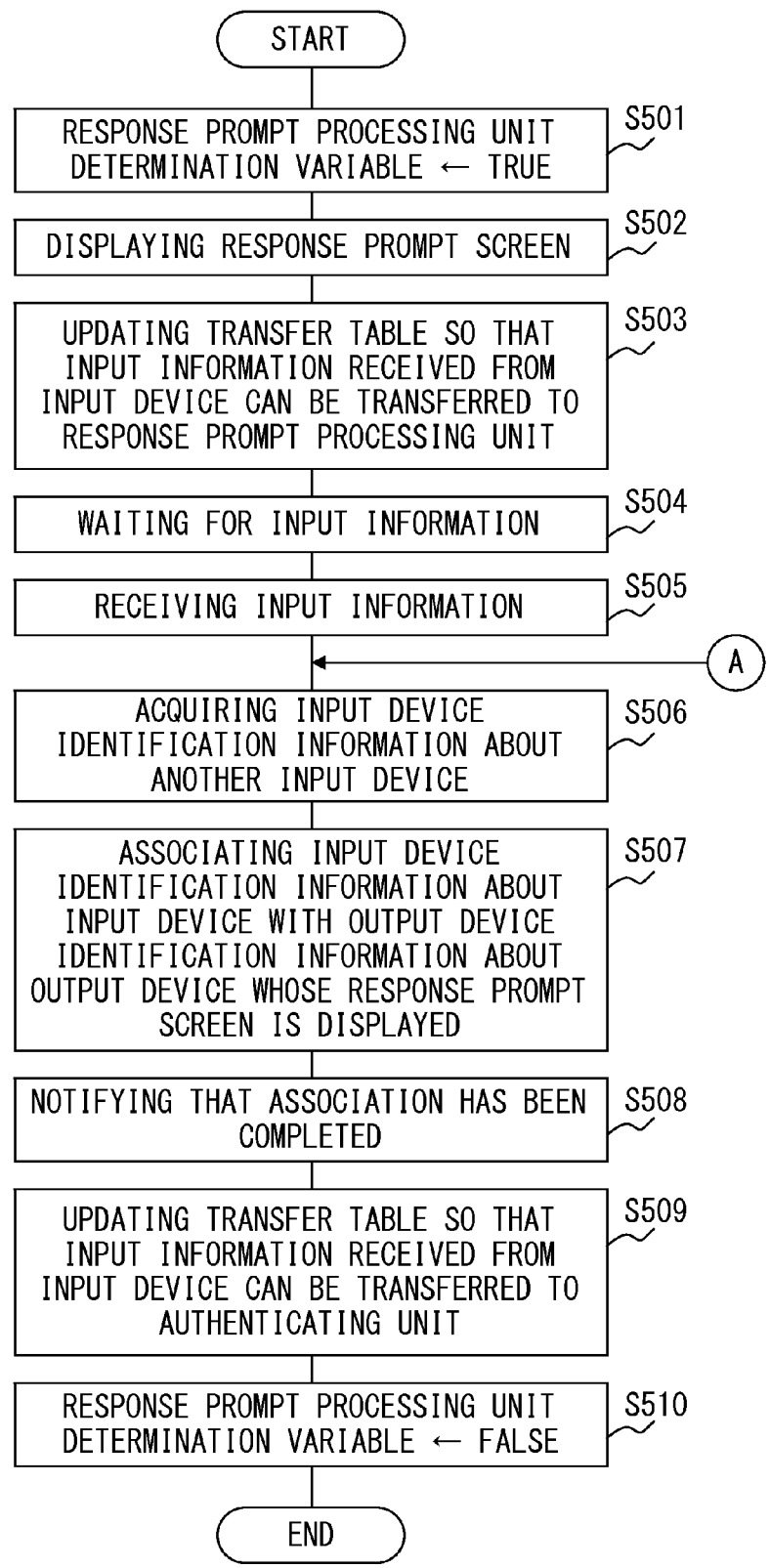
FIG. 13 is a flowchart of the procedure of the process performed by the input information processing unit and the response prompt processing unit according to an embodiment of the present invention.

Described next is the procedure of the process when the CPU 30 functions as the response prompting process. FIG. 13 is a flowchart of the procedure of the process performed by the input information processing unit 300 and the response prompt processing unit 301 according to an embodiment of the present invention.

Upon receipt of the output device identification information about the output device 1 notified from the wait determination unit 303 and determined as newly activated, and the coordinates of the entire screen data area of the output device 1, the response prompt processing unit 301 of the CPU 30 determines that the value of the response prompt processing unit determination variable as "true" (S501). The response prompt processing unit 301 of the CPU 30 allows the output device 1 notified from the wait determination unit 303 to display a response prompt screen. The response prompt processing unit 301 obtains the coordinates of the center from the coordinates of the entire screen data area of the output device 1 notified from the wait determination unit 303, and displays the response prompt screen on the output device 1 according to the obtained coordinates of the center (S502).

The response prompt processing unit 301 of the CPU 30 updates the transfer table so that the input information received from the input device 2 connected to the input interface 36 can be transferred to the response prompt processing unit 301 (S503). The response prompt processing unit 301 waits for the input device identification information from the input device 2 (S504). The input information processing unit 300 of the CPU 30 receives the input information from any input device 2 (S505), and transfers the received input information from the input device 2 to the response prompt processing unit 301 according to the contents of the transfer table. The response prompt processing unit 301 searches the input device grouping table T2 according to the input device identification information included in the input information about the input device 2 in which the response inputting operation is performed, and the grouping number corresponding to the input device identification information about the input device 2 is designated.

Furthermore, the response prompt processing unit 301 acquires the input device identification information about another input device 2 stored as associated with the same grouping number according to the designated grouping number (S506). With reference to FIG. 8, the acquisition of the input device identification information is concretely described below. The response prompt processing unit 301 searches the input device grouping table T2 according to the input device identification information "0x1000-0002" of the input device 2 in which response input has been performed, and designates the grouping number "Group 0". Furthermore, the response prompt processing unit 301 acquires the input device identification information "0x1000-0001" of the input device 2 associated with the designated grouping number "Group 0".

The response prompt processing unit 301 of the CPU 30 associates the input device identification information about the input device 2 included in the input information and the acquired input device identification information about the input device 2 with the output device identification information about the output device 1 whose response prompt screen is displayed (S507), and stores the association result in the input-output-device-to-virtual-device association table T3.

The response prompt processing unit 301 of the CPU 30 notifies the input information processing unit 300 of the input device identification information about the input device 2 and the output device identification information about the output device 1, and the completion of the association of the input device 2 with the output device 1 (S508). The input information processing unit 300 updates the transfer table so that the input information received from the input device 2 whose association has been completed can be transferred to the CPU authenticating unit 307 (S509). In addition, the input information processing unit 300 notifies the authenticating unit 307 of the input device identification information about the input device 2 to be authenticated and the output device identification information about the output device 1. The response prompt processing unit 301 of the CPU 30 defines the response prompt processing unit determination variable as "false" (S510), thereby terminating the process.

Figure 14:
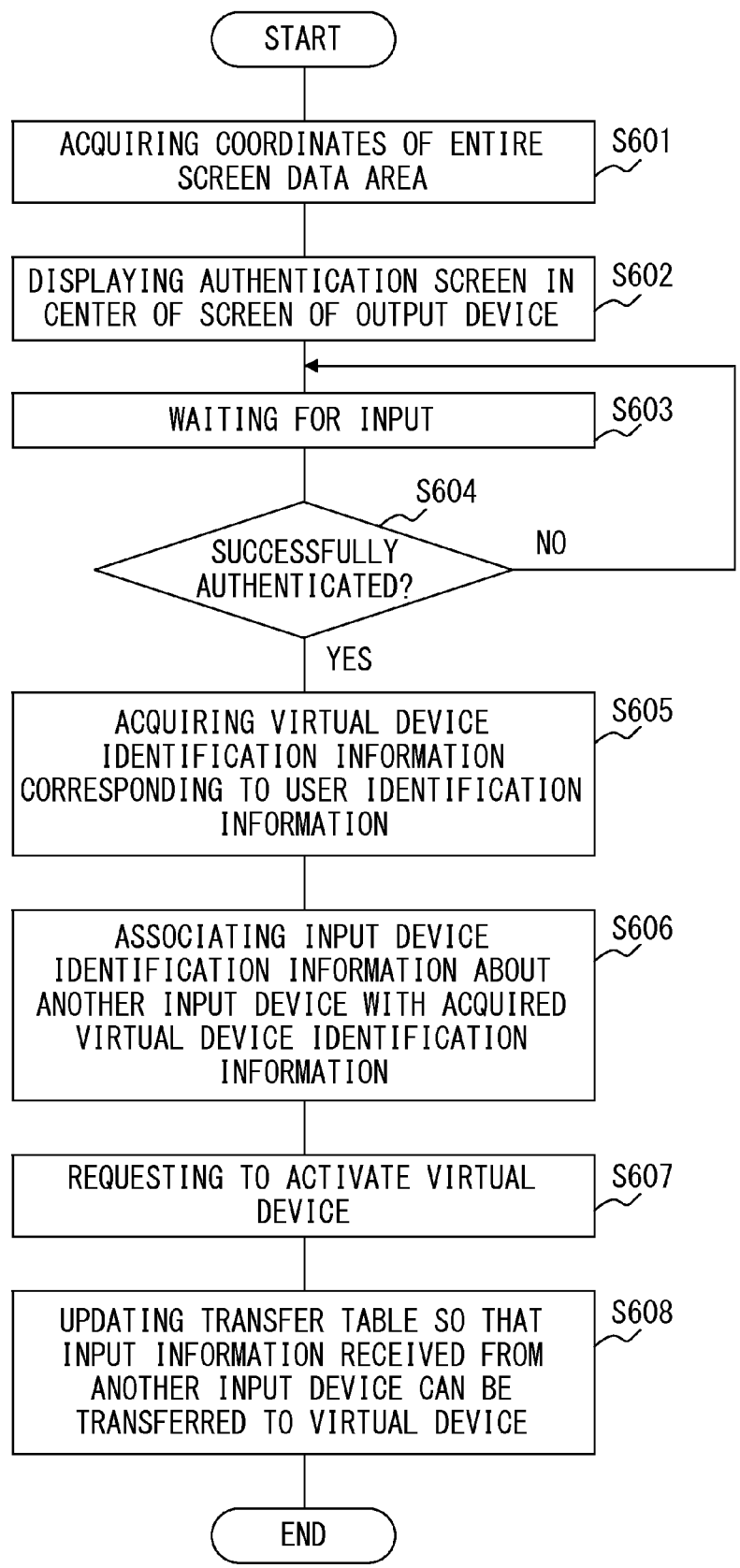
FIG. 14 is a flowchart of the procedure of the process performed by the authenticating unit according to an embodiment of the present invention.

Next, the procedure of the process performed when the CPU 30 functions as the authenticating unit 307 is described. FIG. 14 is a flowchart of the procedure of the process performed by the authenticating unit 307 according to an embodiment of the present invention.

The authenticating unit 307 of the CPU 30 acquires the coordinates of the entire screen data area of the output device 1 notified from the input information processing unit 300 (S601). The authenticating unit 307 of the CPU 30 determines the central part of the screen of the output device 1 based on the acquired coordinates of the entire screen, and displays the authentication screen at the center of the screen of the output device 1 (S602). The authenticating unit 307 of the CPU 30 waits for the input of the authentication information from the user (S603), and when it receives the input information from the input device 2, it authenticates the user according to the received input information. The authentication of the user is described above. The authenticating unit 307 of the CPU 30 determines whether or not the authentication of the user has been successfully performed (S604). When the authenticating unit 307 of the CPU 30 determines that the authentication of the user has not been successfully performed (NO in S604), control is returned to step S603, and waits for the input of the authentication information until the next authentication information is received.

On the other hand, when the authenticating unit 307 of the CPU 30 determines that the user has been successfully authenticated (YES in S604), the virtual device identification information corresponding to the authenticated user identification information is acquired from the user-to-virtual-device association table T1 (S605). The authenticating unit 307 of the CPU 30 associates the input device identification information about the source input device 2 with the acquired virtual device identification information, and stores the association result in the input-output-device-to-virtual-device association table T3. In addition, the authenticating unit 307 searches the grouping table according to the input device identification information about the source input device 2, and designates the grouping number associated with the input device identification information about the source input device 2. The authenticating unit 307 acquires the input device identification information about another input device 2 associated with the designated grouping number, associates the input device identification information about the other acquired input device 2 with the acquired virtual device identification information (S606), and stores the associated identification information in the input-output-device-to-virtual-device association table T3.

The authenticating unit 307 of the CPU 30 requests the virtual device management unit 306 to activate a virtual device corresponding to the acquired virtual device identification information (S607). The authenticating unit 307 updates the transfer table so that the input information received from the source input device 2 and the other acquired input device 2 can be transferred to the virtual device (S608), thereby terminating the process.

Described next is the procedure of the process performed when the CPU 30 functions as the input information processing unit 300. FIG. 15 is a flowchart of the procedure of the process performed by the input information processing unit 300 according to an embodiment of the present invention.

The input information processing unit 300 of the CPU 30 superposes a transparent display layer on the display surface of the output device 1 based on the coordinates of the entire screen data area of the output device 1 notified from the response prompt processing unit 301 (S701). The transparent display layer indicates an interface for allowing the input device identification information about the input device 2 to be acquired. The transparent display layer is used when an OS (operating system) through which input device identification information about the input device 2 such as Windows (registered trademark) etc. is not reported to an application is used, and is not used for the OS in which the input device identification information about the input device 2 such as Linux etc. is reported to an application.

The input information processing unit 300 of the CPU 30 detects the mouse connected to the input interface 36 (S702), and generates an operation tracing arrow P for each detected mouse (S703). The operation tracing arrow P indicates the input position on the screen after the movement of the mouse, and corresponds to, for example, a mouse cursor. All generated operation tracing arrows P is displayed on the response prompted output device 1 until the association of the input-output devices is completed. The generation and display of the operation tracing arrow P on the output device 1 can be performed not only by the input information processing unit 300, but also by the control program (not illustrated in the attached drawings) such as an OS etc. operating on the CPU 30.

The input information processing unit 300 of the CPU 30 receives the input information from the input device 2 (S704), and detects the movement range of the operation tracing arrow P which traces the mouse operation (S705). The input information processing unit 300 of the CPU 30 transfers the input information to each destination processing unit set in the transfer table (S706), thereby terminating the process.

Described next is the procedure of the process performed when the CPU 30 functions as a wait releasing process as a function of the wait determination unit 303. FIG. 16 is a flowchart of the procedure of the wait releasing process performed by the wait determination unit 303 according to an embodiment of the present invention.

When the wait storage unit 304 stores the output device identification information about the output device 1 as waiting for the completion of the process by another output device 1, and when the input information is input to the response prompted output device 1, the wait determination unit 303 of the CPU 30 acquires the first stored output device identification information about the output device 1 as waiting for the completion of the process by another output device 1, that is, the first stored output device identification information about the output device 1 in the output device identification information about the output devices 1 stored in the wait storage unit 304 (S801). The wait determination unit 303 determines whether or not there is output device identification information stored as waiting for the completion of the process by another output device 1 (S802), and terminates the wait releasing process is it determines that there is no output device identification information (NO in S802).

On the other hand, when the wait determination unit 303 of the CPU 30 determines that there is output device identification information (YES in S802), it terminates the display of the wait screen displayed on the output device 1 waiting for the completion of the process by another output device 1 (S803). The wait determination unit 303 of the CPU 30 notifies the response prompt processing unit 301 of the output device identification information about the output device 1, and updates the setting of the transfer table so that the input information from the input device 2 can be transferred to the response prompt processing unit 301 (S804). When a user can avoid simultaneously transmitting a response from the input device 2 using another device, the wait determination unit 303, the wait storage unit 304, and the wait processing unit 305 are unnecessary. In this case, although the response prompt processing unit 301 detects the new activation of the output device 1, it displays the response prompt screen for the detected output device without inquiring of the wait determination unit 303 whether or not another output device 1 is in the response prompting process. The subsequent processes are the same as those of the response prompt processing unit 301 etc. as described above.

As described above, when the activation of the output device is detected, the response prompt screen is displayed on the output device, and associates the output device with the input device depending on the input of the response according to the instruction on the response prompt screen, thereby enabling the association between the output device and the input device only by performing the operation according to the instruction to a user without setting a specific key for the association. In addition, when a plurality of users simultaneously return responses, a response prompting process is exclusively performed, thereby appropriately associating the input device 2 with the output device 1 to be used by a user.

Embodiment 2

In the above-mentioned embodiment 1, the process of sequentially performing the association between the output device and the input device for each output device is exemplified. In the embodiment 2, when a non-input state of input information on the response prompt screen exceeds a predetermined time after displaying the response prompt screen on the output device 1, the wait state of the output device 1 waiting for the completion of the process of the output device is unconditionally released. In this case, the response prompt screen is displayed on the output device 1 waiting for the completion of the process by another output device, and the wait screen is displayed on the response prompted output device 1. The embodiment is described with reference to the embodiment 2.

FIG. 17 is a block diagram of the configuration of the input-output management device according to an embodiment of the present invention. In the input-output management device according to the embodiment 2, await determination unit 303a with a timer of the input-output management device has a timer function in addition to the function of the wait determination unit 303 according to the embodiment 1. Described below is the wait determination unit 303a with a timer according to the embodiment 2. Since the components other than the wait determination unit 303a with a timer have the same configurations as in the embodiment 1, the corresponding components are assigned the same reference numerals and the detailed descriptions are omitted here.

Upon receipt of a request from the output device activation management unit 302, the wait determination unit 303a with a timer determines whether or not there is a response prompted output device 1. When the wait determination unit 303a with a timer determines that there is a response prompted output device 1, it requests the wait processing unit 305 to display a wait screen.

On the other hand, when the wait determination unit 303a with a timer determines that there is no response prompted output device 1, it requests the response prompt processing unit 301 to display the response prompt screen. The wait determination unit 303a with a timer counts the waiting time from the display of the response prompt screen by the response prompt processing unit 301 to the reception of input information. When the wait determination unit 303a with a timer determines that the waiting time has reached a predetermined time, the display of the response prompt screen displayed on the response prompted output device 1 is terminated, and the wait screen is displayed instead. In addition, the wait determination unit 303a with a timer terminates the display of the wait screen displayed on the output device 1 waiting for the completion of the process by another output device 1, and requests the response prompt processing unit 301 to display the response prompt screen. The predetermined time is preset by an administrator, and the setting data is stored in the auxiliary storage device 34.

Figure 18:
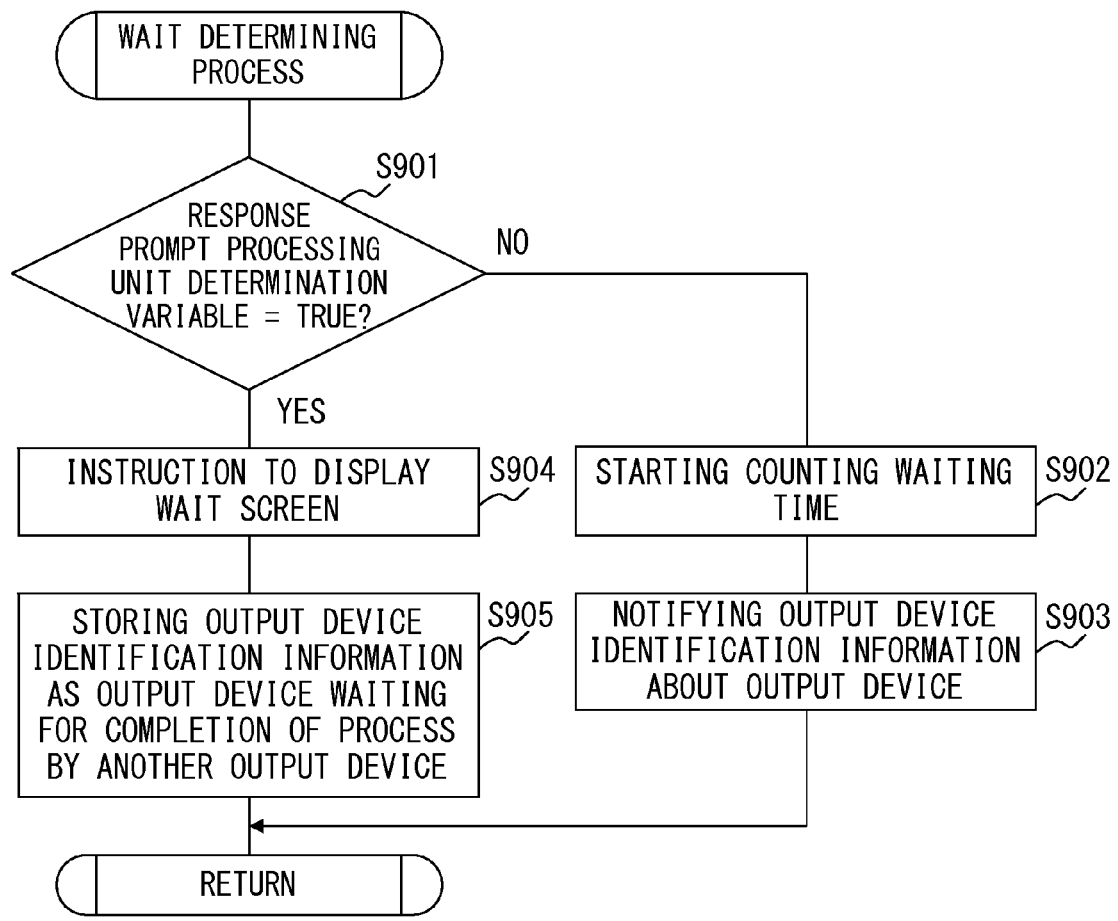
FIG. 18 is a flowchart of the procedure of the wait determining process according to the embodiment 2.

FIG. 18 is a flowchart of the procedure of the wait determining process according to the embodiment 2. The wait determination unit 303a with a timer of the CPU 30 determines whether or not the response prompt processing unit determination variable indicating that the response prompt processing unit 301 is performing its process is "true" (S901). When the wait determination unit 303a with a timer of the CPU 30 determines that the response prompt processing unit determination variable is not "true" (NO in S901), the count of the waiting time is started (S902). The wait determination unit 303a with a timer notifies the response prompt processing unit 301 of the output device identification information about the output device 1 (S903), and waits for the reception of the request for the performance of the next process.

On the other hand, when the wait determination unit 303a with a timer of the CPU 30 determines that the response prompt processing unit determination variable is "true" (YES in S901), it determines that there is the response prompted output device 1, and instructs the wait processing unit 305 to display a wait screen on the output device 1 (S904).

The wait determination unit 303a with a timer of the CPU 30 stores in the wait storage unit 304 the output device identification information about the output device 1 displayed on the wait screen as the output device 1 waiting for the completion of the process by another output device 1 (S905), and waits for the reception of the request for the performance of the next process.

Figure 19:
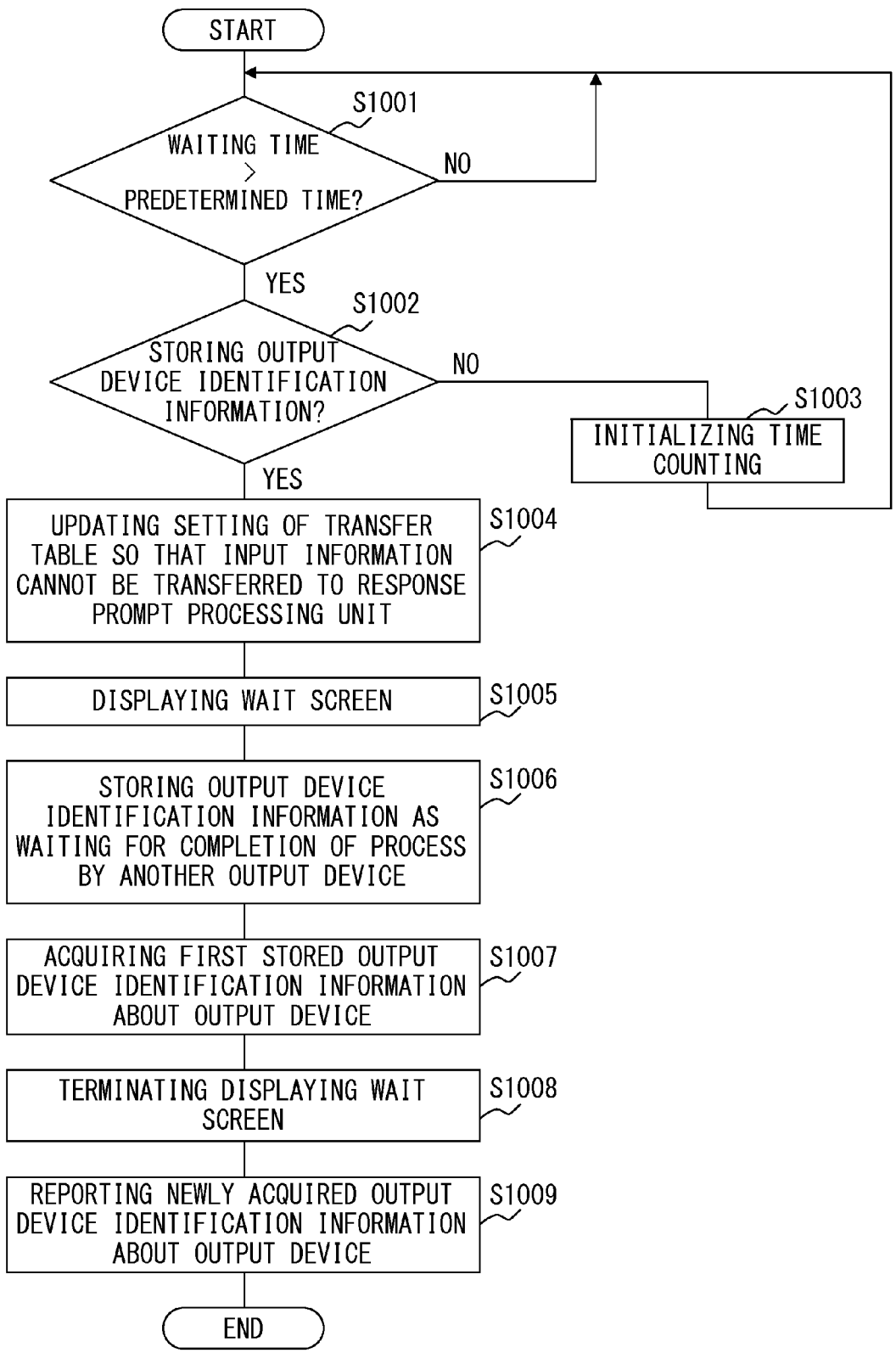
FIG. 19 is a flowchart of the procedure of the wait releasing process performed by the wait determination unit with a timer according to the embodiment 2.

FIG. 19 is a flowchart of the procedure of the wait releasing process performed by the wait determination unit 303a with a timer according to the embodiment 2. The wait determination unit 303a with a timer of the CPU 30 determines whether or not the waiting time to be counted exceeds a predetermined time (S1001). When the wait determination unit 303a with a timer determines that the waiting time equals or does not reach the predetermined time (NO in S1001), control is returned to step S1001, and the process is repeated.

On the other hand, when the wait determination unit 303a with a timer of the CPU 30 determines that the waiting time has exceeded the predetermined time (YES in S1001), it determines whether or not the output device identification information about the output device 1 waiting for the completion of the process by another output device 1 is stored in the wait storage unit 304 (S1002). When the wait determination unit 303a with a timer determines that the output device identification information about the output device 1 waiting for the completion of the process by another output device 1 is not stored in the wait storage unit 304 (NO in S1002), the time count is initialized (S1003), control is returned to step S1001, and the process is repeated.

On the other hand, when the wait determination unit 303a with a timer determines that the output device identification information about the output device 1 waiting for the completion of the process by another output device 1 is stored in the wait storage unit 304 (YES in S1002), the setting of a transfer table is updated so that the input information cannot be transferred to the response prompt processing unit 301 (S1004), the display of the response prompt screen on the response prompted output device 1 is terminated, and the wait screen is displayed by the wait processing unit 305 instead (S1005). The wait determination unit 303a with a timer of the CPU 30 stores in the wait storage unit 304 the output device identification information about the output device 1 which has not transmitted a response within a predetermined time as waiting for the completion of the process by another output device 1 (S1006).

The wait determination unit 303a with a timer of the CPU 30 acquires from the wait storage unit 304 the output device identification information about the output device 1 first stored as waiting for the completion of the process by another output device 1, that is, the output device identification information about the first stored output device 1 in the output devices 1 stored as the output devices 1 waiting for the completion of the process by another output device 1 (S1007). The wait determination unit 303a with a timer terminates the display of the wait screen displayed on the output device 1 waiting for the completion of the process by another output device 1 (S1008). The wait determination unit 303a with a timer of the CPU 30 notifies the response prompt processing unit 301 of the newly acquired output device identification information about the output device 1 (S1009). The response prompt processing unit 301 displays the response prompt screen on the output device 1 waiting for the completion of the process by another output device 1, and terminates the wait releasing process.

Thus, the input-output management device according to the embodiment 2 has the above-mentioned configuration to produce an effect according to the above-mentioned embodiment 1, and when the non-input state of response information exceeds a predetermined time, the wait state of the output device 1 waiting for the completion of the process by another output device 1 is unconditionally released, and the input-output management can be smoothly performed. Thus, the embodiment 2 is described above.

Embodiment 3

In the embodiments 1 and 2 above, it is assumed that each input device 2 is operated near the output device 1 to be associated, and the display position of the OK button for input of the input information is fixed. Described in the embodiment 3 is, for example, a case in which a user not capable of visually recognizing the response prompt screen checks the position of the OK button and operates the input device 2, thereby matching the display position of the OK button displayed on the output device 1 with the position of the operation tracing arrow P operated in the input device 2 not close to the output device 1, and preventing the association between unexpected input-output devices.

FIG. 20 is a block diagram of the configuration of the input-output management device according to an embodiment of the present invention. The input-output management device according to the embodiment 3 is different from the embodiments 1 and 2 in that it includes a response prompt processing unit 301a with a random display function for determining at random the display position of the OK button. Then, described below is the response prompt processing unit 301a with a random display function according to the embodiment 3. Since the components other than the response prompt processing unit 301a with a random display function have the same configurations as those in the embodiments 1 and 2, the corresponding component is assigned the same reference numeral, and the detailed description is omitted here.

When the response prompt processing unit 301a with a random display function receives a request to display a response prompt screen from the wait determination unit 303, it determines at random the display position of the OK button within the response prompt screen based on the random number stored in advance in the holder of the auxiliary storage device 34. The response prompt processing unit 301a with a random display function records the coordinates of the determined display position of the OK button. The response prompt processing unit 301a with a random display function displays the response prompt screen on the newly activated output device 1.

When the response prompt processing unit 301a with a random display function receives the input information transferred from the input information processing unit 300, it compares the coordinate information included in the input information with the recorded coordinates of the display position of the OK button, and determines whether or not the coordinate information included in the input information is within the range of the recorded coordinates of the display position of the OK button. If the response prompt processing unit 301a with a random display function determines that the coordinate information included in the input information is not within the recorded coordinates of the display position of the OK button, then it determines that the information is not correct response information, and waits for the reception of the next input information. In this case, the response prompt processing unit 301a with a random display function counts the number of times in which correct response information is not input, and can determine that the association is not successfully performed when the count number exceeds a predetermined number of times.

On the other hand, if the response prompt processing unit 301a with a random display function determines that the coordinate information included in the input information is within the range of the recorded coordinates of the display position of the OK button, it determines that the input information is appropriate response information, associates the input device identification information about the input device 2 to which the input information is input with the output device identification information about the response prompted output device 1, and stores the association result in the input-output-device-to-virtual-device association table T3.

Furthermore, the response prompt processing unit 301a with a random display function searches the input device grouping table T2 based on the input device identification information about the input device 2 to which input information has been input, designates the grouping number associated with the input device identification information about the input device 2 to which the input information has been input, and confirms whether or not there is an another input device 2 associated with a designated grouping number. When the response prompt processing unit 301a with a random display function confirms that there is another input device 2, it associates the input device identification information about another input device 2 stored as associated with the designated grouping number with the output device identification information about the response prompted output device 1, and stores the association result in the input-output-device-to-virtual-device association table T3.

Thus, the input-output management device according to the embodiment 3 has the above-mentioned configuration to produce an effect according to the above-mentioned embodiment 1 or 2, can prevent a user not capable of visually recognizing the response prompt screen from memorizing the display position of the OK button, can suppress the event in which the display position of the OK button displayed on the output device 1 matches the position of the operation tracing arrow P operated by the input device 2 not close to the output device 1, and can perform unexpected association between input-output devices. Thus, described is the embodiment 3.

Embodiment 4

In the embodiments 1 and 2 above, it is assumed that each input device 2 is operated near the output device 1 to be associated, and the display position of the OK button for input of the response information is fixed. In the embodiment 3, it is assumed that each input device 2 is not close to the output device 1 to be associated, and the display position of the OK button is determined at random. Described in the embodiment 4 is an example in which, for example, to prevent the display position of the OK button displayed on the output device 1 from incidentally matching the position of the operation tracing arrow P operated in the input device 2 not close to the output device 1 by a user not capable of visually recognizing the response prompt screen operating a number of input devices 2, and unexpected input-output devices from being associated, when the OK button is not pressed, that is, the input of the input information other than the response information exceeds a predetermined number of times, the input information output from the input device 2 is nullified.

FIG. 21 is a block diagram of the configuration of the input-output management device according to an embodiment of the present invention. The input-output management device according to the embodiment 4 is different from those according to the embodiments 1 through 3 in that the input information processing unit 300 is an input information processing unit 300a with a nullifying function for nullifying received input information, and the response prompt processing unit 301 is a response prompt processing unit 301b with a nullify input determining function. Described below are the input information processing unit 300a with a nullifying function and the response prompt processing unit 301b with a nullify input determining function according to the embodiment 4. Since the components other than the input information processing unit 300a with a nullifying function and the response prompt processing unit 301b with a nullify input determining function have the same configurations as those according to the embodiments 1 through 3, they are assigned the same reference numerals and the detailed descriptions are omitted here.

The input information processing unit 300a with a nullifying function receives input information through the input device control unit 37. The input information processing unit 300a with a nullifying function transfers the received input information to each unit of the CPU 30 depending on the setting contents of the transfer table. When the input information processing unit 300a with a nullifying function receives a nullify request from the response prompt processing unit 301b with a nullify input determining function, it nullifies the input information output from the target input device 2 and stops transferring the information to each unit.

When the response prompt processing unit 301b with a nullify input determining function receives the input information transferred from the input information processing unit 300a with a nullifying function, it determines whether or not the received input information is response information. As a result, if the response prompt processing unit 301b with a nullify input determining function determines that input information is response information, then it associates the input device identification information about the input device 2 to which the response information has been input with the output device identification information about the response prompted output device 1, and stores the association result in the input-output-device-to-virtual-device association table T3. Furthermore, the response prompt processing unit 301b with a nullify input determining function searches the input device grouping table T2 according to the input device identification information about the input device 2 to which the input information has been input, designates the grouping number associated with the input device identification information about the input device 2 to which the input information has been input, and confirms whether or not there is another input device 2 associated with the designated grouping number. When the response prompt processing unit 301b with a nullify input determining function confirms that there is another input device 2, it associates the input device identification information about the other input device 2 stored as associated with the designated grouping number with the output device identification information about the response prompted output device 1, and stores the association result in the input-output-device-to-virtual-device association table T3.

On the other hand, when the response prompt processing unit 301b with a nullify input determining function determines that the input information is not response information, it increases the number of input times managed for each source input device 2. When the response prompt processing unit 301b with a nullify input determining function determines that the increased number input times has reached a predetermined number of times, it outputs the request to nullify the input information from the input device 2 to the input information processing unit 300a with a nullifying function. The predetermined number of times is, for example, set by an administrator in advance and the data is stored in the auxiliary storage device 34.

The process of the response prompt processing unit 301b with a nullify input determining function according to the embodiment 4 is different from the embodiments 1 through 3 in the process contents of the response prompt processing unit 301 described with reference to FIG. 1 in that a determination to nullify input information before performing the process in step S506 after receiving the input information from the input device 2 in step S505 (FIG. 13). Described below is the process of determining for nullification performed by the CPU 30 in the embodiment 4. Since the other processes are the same as those according to the embodiments 1 through 3, the corresponding steps are assigned the same step numbers and the detailed descriptions are omitted here.

Figure 22:
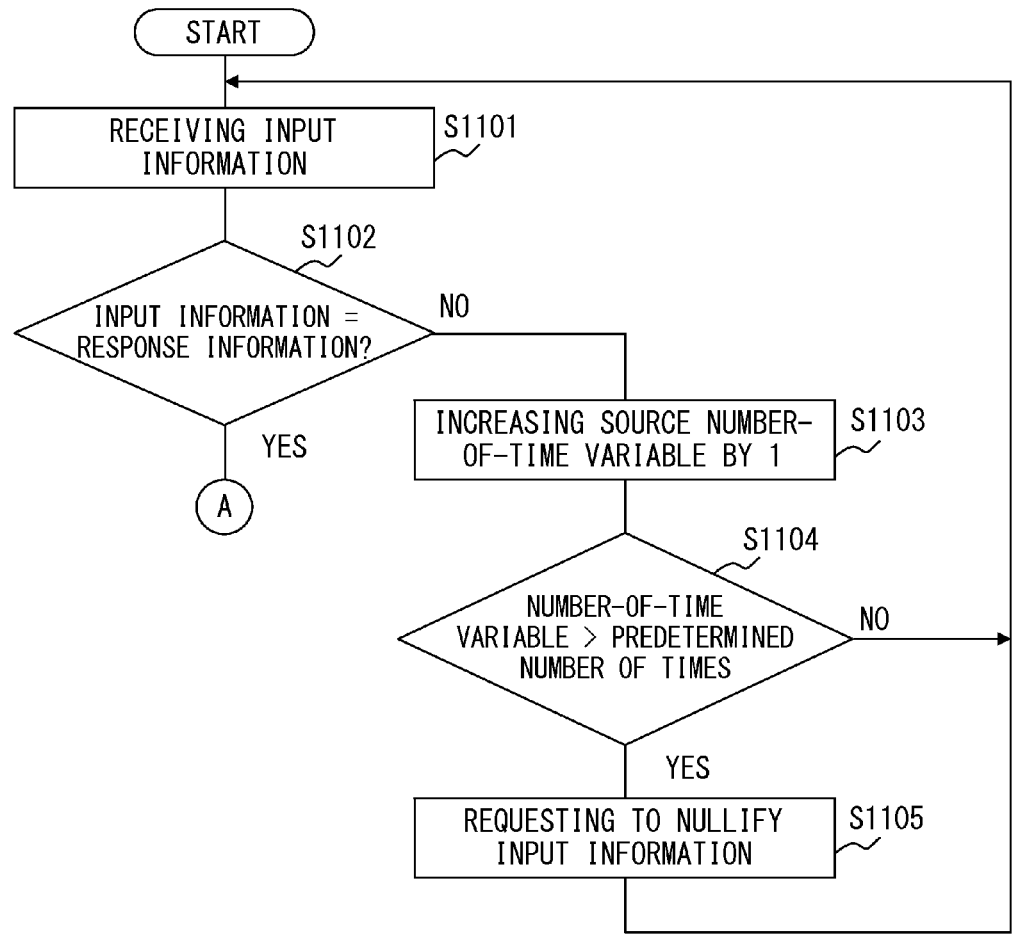
FIG. 22 is a flowchart of the procedure of the process performed by the response prompt processing unit with a nullify input determining function.

The response prompt processing unit 301b with a nullify input determining function performs the same processes as the response prompt processing unit 301 in the processes in steps S501 through S505 in FIG. 13. Then, the response prompt processing unit 301b with a nullify input determining function of the CPU 30 further performs the following processes. FIG. 22 is a flowchart of the procedure of the process performed by the response prompt processing unit 301b with a nullify input determining function.

The response prompt processing unit 301b with a nullify input determining function of the CPU 30 receives the input information transferred from the input information processing unit 300a with a nullifying function (S1101), and determines whether or not the received input information is response information (S1102). As a result, when the response prompt processing unit 301b with a nullify input determining function determines that the received input information is response information (YES in S1102), control is passed to step S506 (FIG. 13), and performs the process of associating the input device 2 with the output device 1.

On the other hand, when the response prompt processing unit 301b with a nullify input determining function of the CPU 30 determines that the received input information is not response information (NO in S1102), it acquires the input device identification information from the source input device 2, and increases the variable of the number of source input times managed for each piece of input device identification information (S1103). The response prompt processing unit 301b with a nullify input determining function of the CPU 30 determines whether or not the variable of the increased number of times exceeds a predetermined number of times (S1104). When it determines that the variable of the number of times does not reach the predetermined number of times (NO in S1104), control is returned to step S1101, and the process is repeated. It is also possible not to return control to S1101, but temporarily terminate the process of the response prompt processing unit 301b with a nullify input determining function. In this case, the screen on which a notification that no response can be recognized can be displayed on the output device 1. Furthermore, in this case, the reactivation of the output device 1 can be requested. In another form of the embodiment, no activation is requested, a request to process the output device 1 as a target of the waiting process is issued to the wait determination unit 303, and after temporarily displaying the wait screen, the response prompt screen is displayed again, and the process of associating the input device 2 with the output device 1 can be resumed.

On the other hand, when the response prompt processing unit 301b with a nullify input determining function of the CPU 30 determines that the variable of the number of times exceeds a predetermined number of times (YES in S1104), it requests the input information processing unit 300a with a nullifying function to nullify input information output from the source input device (S1105). The response prompt processing unit 301b with a nullify input determining function of the CPU 30 returns control to step S1101, and repeats the process.

Thus, the input-output management device according to the embodiment 4 produces the effects according to the embodiments 1 through 3 by having the above-mentioned configurations, can prevent a user not capable of visibly recognizing the response prompt screen from a number of input devices 2, can suppress the event in which the display position of the OK button displayed on the output device 1 matches the position of the operation tracing arrow P operated by the input device 2 not close to the output device 1, and can perform unexpected association between input-output devices. Thus, described is the embodiment 4.

In the embodiments above, the output device control unit 39 is a sheet of graphic card to individually control the display of a plurality of input devices 2. However, the present invention is not limited to this application, and there can be a plurality of graphic cards to allow each card to individually control the display of each input device 2.

In addition, in the embodiments above, although the power supply stops to the information processing device 3, the input-output-device-to-virtual-device association table T3 is stored in the database DB1. However, the present invention is not limited to this application, and the input-output-deviceto-virtual-device association table T3 can be deleted from the database DB1 after the power supply to the information processing device 3 has stopped. In this case, the information processing device 3 activated next time performs the association again.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An input-output management device to which an input device and an output device are connected, and outputting to the output device a result of a process on input information received from the input device, comprising:
   a first connection device connecting a plurality of input devices;
   a second connection device connecting a plurality of output devices;
   a detection device detecting that an output device connected to the second connection device is activated;
   a display control device instructing the detected output device to display a response prompt screen requesting a response by an input device; and
   an association management device associating an input device which has returned a response with an output device displaying the response prompt screen based on a response by an input device connected to the first connection device on the response prompt screen, wherein
   when the response prompt screen is displayed on a first output device and an activation of a second output device different from the first output device is detected, the display control device displays a wait screen for information about waiting for a completion of a process by the first output device.

2. The device according to claim 1, further comprising:
   a count device counting a waiting time from the display control device displaying the response prompt screen to a response received from the input device connected to the first connection device on the response prompt screen, wherein
   when the waiting time counted by the count device reaches a predetermined time, the display control device terminates displaying the response prompt screen.

3. The device according to claim 1, wherein
   the display control device displays a response prompt screen having different display contents on the output device detected by the detection device for every request of the response with the input device.

4. The device according to claim 3, wherein,
   the response prompt screen has a button for inputting prompt information; and
   the display control device displays on a response prompt screen by changing at random a display position of the button.

5. The device according to claim 1, further comprising:
   a count device counting a number of input times of input information other than a response on the response prompt screen for each input device connected to the first connection device; and
   a nullifying device nullifying input information received from an input device whose number of input times has exceeded a predetermined number.

6. The device according to claim 1, wherein,
   the first connection device comprises a grouping device for grouping a plurality of connected input devices into predetermined sections; and
   the management device associates an input device in a same section as an input device to which the prompt information is input with an output device on which the response prompt screen is displayed.

7. An information processing device provided with resources for processing input information received from an input device, comprising:
   the input-output management device according to claim 1;
   an assignment device assigning the input information received from the input device to the resources; and
   a device outputting a result of a process by assigned resources to an output device corresponding to the input device to which the input information is input.

8. An information processing device provided with plural pieces of abstracted logical resources for processing plural pieces of input information received from an input device, comprising:
   the input-output management device according to claim 1;
   an assignment device assigning the input information received from the input device to any of the resources; and
   a device outputting a result of a process by assigned logical resources to an output device corresponding to the input device to which the input information is input.

9. A computer-readable, non-transitory medium storing an input-output managing program used to direct a computer to output to a connected output device a result of a process for input information received from an input device connected to the computer, comprising:
   detecting that an output device has been activated;
   displaying a response prompt screen on which the detected output device is requested for a response by an input device; and
   associating an input device which has returned a response with an output device which displays the response prompt screen based on the response of the input device, wherein
   when the response prompt screen is displayed on a first output device and an activation of a second output device different from the first output device is detected, the displaying displays a wait screen for information about waiting for a completion of a process by the first output device.

10. The computer-readable, non-transitory medium according to claim 9, further comprising:
    counting a waiting time from display of the response prompt screen to reception of a response from an input device connected to the first connection device on the response prompt screen; and
    terminating the display on the response prompt screen when the waiting time to be counted reaches a predetermined time.

11. The computer-readable, non-transitory medium according to claim 10, further comprising:
    displaying the response prompt screen having different display contents on the detected output device.

12. The computer-readable, non-transitory medium according to claim 11, wherein,
    the response prompt screen comprises a button for inputting prompt information; and the computer further performs displaying a display position of the button after changing the position at random on a response prompt screen of the detected output device.

13. The computer-readable, non-transitory medium according to claim 9, further comprising:

counting a number of input times of input information other than a response on the response prompt screen for each connected input device; and nullifying the input information received from an input device whose number of input times has exceeded a predetermined number.

14. The computer-readable, non-transitory medium according to claim 9, further comprising:

suppressing displaying a response prompt screen on which association with a second output device is requested on a second output device until the first output device is associated, when the response prompt screen is displayed on the first output device and activation of the second output device different from the first output device is detected.

15. The computer-readable, non-transitory medium according to claim 9, further comprising:

grouping a plurality of connected input devices into predetermined sections;

associating an input device in a same section as the input device to which the prompt information is input with an output device whose response prompt screen is displayed.

* * * * *